(12) United States Patent
Masuda

(10) Patent No.: US 7,620,582 B2
(45) Date of Patent: Nov. 17, 2009

(54) METHOD OF GENERATING AND DISPLAYING STOCK INDEX

(75) Inventor: Tokutaro Masuda, Yokohama (JP)

(73) Assignee: Masuda Economic Research Institute Ltd., Yokohama-shi (JP)

( * ) Notice: Subject to any disclaimer, the term of this patent is extended or adjusted under 35 U.S.C. 154(b) by 454 days.

(21) Appl. No.: 11/346,561

(22) Filed: Feb. 3, 2006

(65) Prior Publication Data
US 2006/0195383 A1    Aug. 31, 2006

(30) Foreign Application Priority Data

Feb. 4, 2005    (JP) .............................. 2005-029894
Dec. 21, 2005    (JP) .............................. 2005-368302

(51) Int. Cl.
*G06Q 40/00* (2006.01)
(52) U.S. Cl. ....................................... 705/36 R; 705/37
(58) Field of Classification Search .................... 705/37, 705/36 R, 35
See application file for complete search history.

(56) References Cited

U.S. PATENT DOCUMENTS

| | | | | |
|---|---|---|---|---|
| 5,524,175 | A | * | 6/1996 | Sato et al. ....................... 706/41 |
| 5,878,108 | A | * | 3/1999 | Baba et al. ................... 378/98.4 |
| 6,272,474 | B1 | * | 8/2001 | Garcia ......................... 705/36 R |
| 7,136,710 | B1 | * | 11/2006 | Hoffberg et al. ................ 700/83 |
| 2002/0073017 | A1 | * | 6/2002 | Robertson ..................... 705/37 |
| 2002/0161853 | A1 | * | 10/2002 | Burak et al. .................. 709/218 |
| 2003/0074292 | A1 | * | 4/2003 | Masuda ......................... 705/35 |
| 2005/0075966 | A1 | * | 4/2005 | Duka ........................... 705/37 |
| 2005/0171881 | A1 | * | 8/2005 | Ghassemieh et al. .......... 705/35 |

(Continued)

FOREIGN PATENT DOCUMENTS

JP        2003-085381        3/2003

(Continued)

OTHER PUBLICATIONS

Golden Software, Grapher 3 Product Sheet, (produced from the Web archive: http:IIweb.archive.orglweb120010411111150/www.goldensoftware.com/products/grapher/), Dec. 20, 2000.*

(Continued)

*Primary Examiner*—Hani Kazimi
(74) *Attorney, Agent, or Firm*—Edwards Angell Palmer & Dodge LLP

(57) ABSTRACT

An arithmetic operation for calculating a value of a Masuda ratio (Mratio) or a value substantially equivalent to the Masuda ratio (Mratio) on the basis of the stock price information on a database is executed. The Masuda ratio (Mratio) is represented by a formula Mratio={(B−E)/SUM}×100, where SUM is a total number of stocks of a group of specific stocks forming a basis in generating one representative stock movement index, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 indicating an upward trend when the number of stocks is B, and E is the number of stocks, MA1, MA2, and MA3 having a magnitude relation MA1<MA2<MA3 indicating a downward trend when the number of stocks is E.

7 Claims, 22 Drawing Sheets

U.S. PATENT DOCUMENTS

| | | | |
|---|---|---|---|
| 2007/0088648 A1* | 4/2007 | Mather et al. | 705/36 R |
| 2007/0118452 A1* | 5/2007 | Mather et al. | 705/36 R |
| 2008/0250326 A1* | 10/2008 | Mather | 715/744 |
| 2009/0006241 A1* | 1/2009 | Zhao et al. | 705/37 |
| 2009/0006271 A1* | 1/2009 | Crowder | 705/36 R |

FOREIGN PATENT DOCUMENTS

| | | |
|---|---|---|
| JP | 2003-118268 | 4/2003 |

OTHER PUBLICATIONS

Grapher; version 4, "An efficient and powerful graphing program for your most complex graphing needs"; http://web.archives.org/web/20030207053123/www.goldensoftware.com. 2003.*

Sugimura, Tomio;"Nyumon no Nyumon, 'Kabu' no shikumi;" *Nippon Jitsugyo Publishing*: pp. 156-157 and pp. 172-175, with a copy of cover sheet, index and the translation of abstract of pp. 156-157. (*Discussed in the Specification*).

\* cited by examiner

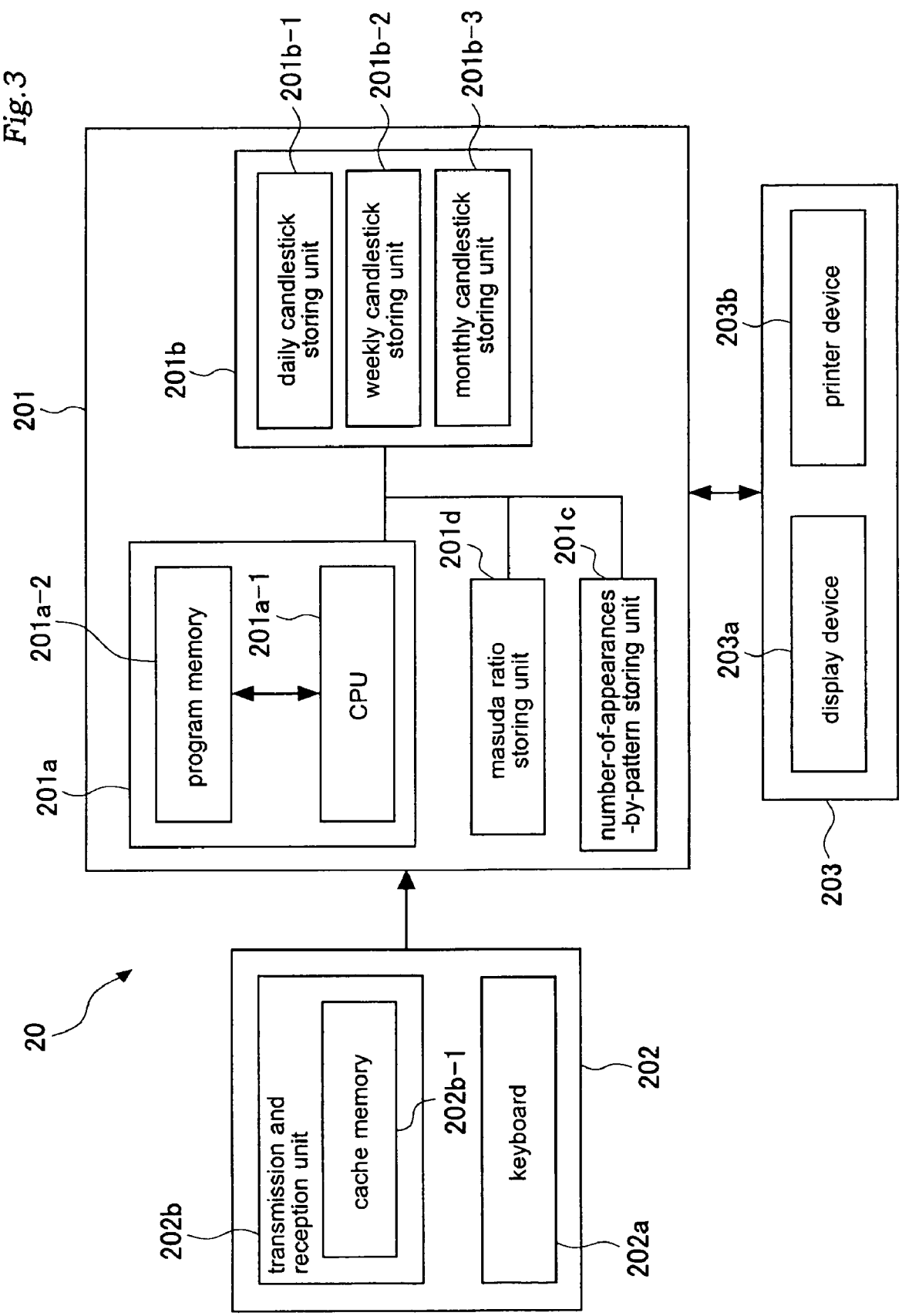

*Fig.4*

| stock | first day | | | | | |
|---|---|---|---|---|---|---|
| | date | opening price | highest price | lowest price | closing price | trading volume |

| second day | | | | | |
|---|---|---|---|---|---|
| date | opening price | highest price | lowest price | closing price | trading volume |

| third day | | | | | |
|---|---|---|---|---|---|
| date | opening price | highest price | lowest price | closing price | trading volume |

| fourth day | | | | | |
|---|---|---|---|---|---|
| date | opening price | highest price | lowest price | closing price | trading volume |

| fifth day | | | | | |
|---|---|---|---|---|---|
| date | opening price | highest price | lowest price | closing price | trading volume |

.
.
.
.
.
.

| Nth day | | | | | |
|---|---|---|---|---|---|
| date | opening price | highest price | lowest price | closing price | trading volume |

Fig.5 daily candlestick storing unit 101□-1

| stock name | date | third day | | | ... | Dth day | | |
|---|---|---|---|---|---|---|---|---|
| | | average closing price | | closing price for the day | | average closing price | | closing price for the day |
| | | short term | medium term / long term | | | short term | medium term / long term | | weekly candlestick storing unit 101□-2

| stock name | date | third week | | | ... | Dth week | | |
|---|---|---|---|---|---|---|---|---|
| | | average closing price | | closing price for the day | | average closing price | | closing price for the day |
| | | short term | medium term / long term | | | short term | medium term / long term | | monthly candlestick storing unit 101□-3

| stock name | date | third month | | | ... | Dth month | | |
|---|---|---|---|---|---|---|---|---|
| | | average closing price | | closing price for the day | | average closing price | | closing price for the day |
| | | short term | medium term / long term | | | short term | medium term / long term | |

*Fig.6*

| stock No.1 | first week to Wth week | B | B | ... | C | C | ... | D | D | ... | E | E |

| stock No.2 | first week to Wth week | C | C | ... | D | D | ... | E | E | ... | F | F | ... | A | A |

| stock No.3 | first week to Wth week | A | A | B | B | ... | C | C | ... | D | D | ... | E | E | ... | F | F |

· · · · · · ·

| stock No.n | first week to Wth week | F | F | ... | A | A | B | B | ... | C | C | ... | D | D |

*Fig. 7*

| | first week to Wth week | | | | |
|---|---|---|---|---|---|
| A | A1 | A2 | A3 | A4 | · · · · · · · · · · · · · |
| B | B1 | B2 | B3 | B4 | · · · · · · · · · · · · · |
| C | C1 | C2 | C3 | C4 | · · · · · · · · · · · · · |
| D | D1 | D2 | D3 | D4 | · · · · · · · · · · · · · |
| E | E1 | E2 | E3 | E4 | · · · · · · · · · · · · · |
| F | F1 | F2 | F3 | F4 | · · · · · · · · · · · · · |

Fig.8
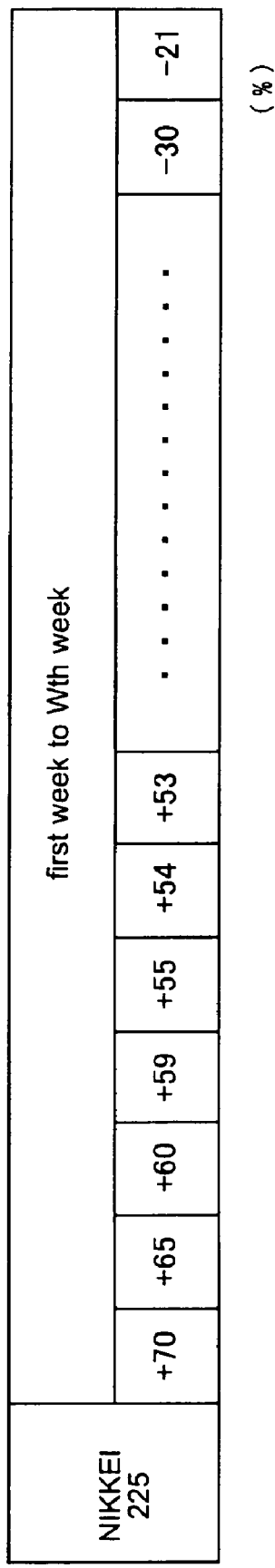
(a) masuda ratio corresponding to NIKKEI 225
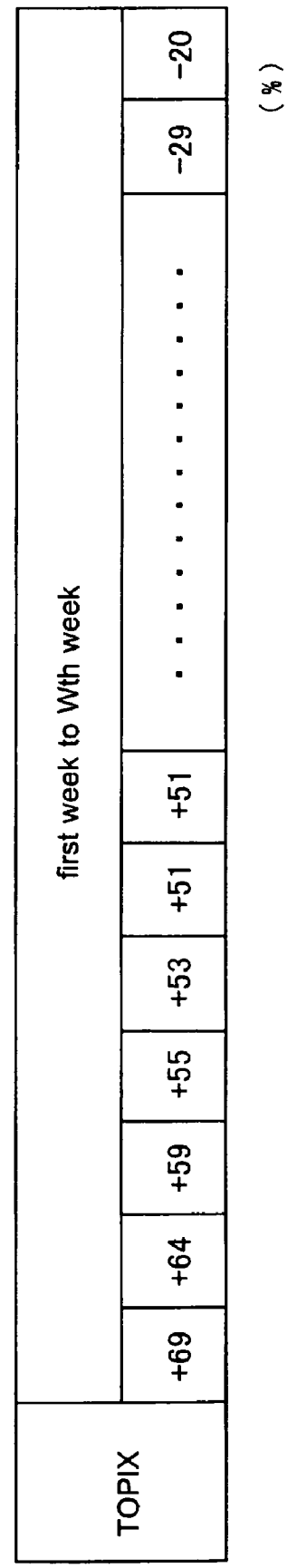
(b) masuda ratio corresponding to TOPIX

METHOD OF GENERATING AND DISPLAYING STOCK INDEX

BACKGROUND OF THE INVENTION

1. Field of the Invention

The present invention relates to a new method of generating and displaying a stock index, a stock price chart generation system to which the method is applied, and a computer program suitable for construction of a server apparatus and a client machine included in the system.

2. Description of the Related Art

The applicant proposed a stock price chart (generally referred to as "Masuda candlestick chart") that is easily understood by beginners in stock trading and is suitable for prediction of stock movements (see Japanese Patent Laid-Open No. 2003-118268). According to this Masuda candlestick chart, a unit value in a time axis direction of the stock price chart (a daily price, a weekly price, or a monthly price) is represented by a vertical bar having a pair of sequential moving average deviations as upper and lower ends and having colors corresponding to increase and decrease tendencies.

The applicant proposed a method of grasping a tendency by classifying a stock price chart into six sections along a time axis on the basis of a relation among magnitudes of respective moving average deviations in a short term, a medium term, and a long term. According to this classification method (generally referred to as "six (color) pattern classification"), a stock price chart of any stock is classified into a pattern A section (short term>long term>medium term) equivalent to an entrance of an upward trend, a pattern B section (short term>medium term>long term) equivalent to the upward trend, a pattern C section (medium term>short term>long term) equivalent to crash of the upward trend, a pattern D section (medium term>long term>short term) equivalent to an entrance of a downward trend, a pattern E section (long term>medium term>short term) equivalent to the downward trend, and a pattern F section (long term>short term>medium term) equivalent to the end of the downward trend (see Japanese Patent Laid-Open No. 2003-85381).

In order to estimate stock movements, various stock indexes have been conventionally adopted. Nikkei Index and Tokyo Stock Exchange stock index (TOPIX) in Japan and NASDAQ, Dow Jones industrial average (DOW), and SP500 in the United States are popular indexes indicating movements of the entire stock market. Apart from the indexes mentioned above, many indexes for predicting stock movements are known in Japan.

For example, bottom prices, highest price zones, overheated conditions, tendencies of selective buying, and the like of market prices can be grasped by analyzing an up-down ratio, a concentration of 10 most-heavily traded issues, a trading unit price, a high rank stock ratio, and the like.

The up-down ratio is calculated by dividing the number of stocks with increased prices by the number of stocks with decreased prices to calculate a quotient and multiplying the quotient by 100. When "day" is set as a calculation reference denomination, the fluctuation becomes too large. Thus, a 25-day moving average line is normally used for all data. The up-down ratio of 100% indicates a neutral state. When the up-down ratio exceeds 100%, since the number of stocks with increased prices increase, market prices are in a bull market with an expanded selective buying range. The up-down ratio around 120% indicates an overheated zone. When percentage exceeds 120%, "selling" is considered. Conversely, the up-down ratio below 100% indicates that the number of stocks with decreased prices increases. The up-down ratio around 70% is judged as bottom price zone.

The concentration of 10 most-heavily traded issues is an index for examining "how much share a total trading volume of 10 most-heavily traded issues occupies in a trading volume of the day". When this concentration is high, an axis of selective buying is clear. When the concentration is low, selective buying is dispersed and unfocused.

The trading unit price is used for learning "stocks of which stock price level is presently bought". The trading unit price is also examined using a moving average line. If the trading unit price is above a simple average price and is still rising, the trading unit price indicates selective buying of high-priced stocks with stock prices at high levels. In the opposite case, the trading unit price indicates selective buying of low-priced stocks.

The high rank stock ratio is calculated by multiplying a quotient, which is calculated by dividing the number of stocks having current prices exceeding the 25-day moving average line by the total number of stocks, by 100. In this case, when the high rank stock ratio exceeds 70%, market prices are in an overheated zone. When the high rank stock ratio falls below 30%, market prices are in a bottom price zone.

A stock price index by industry can also be used as a reference. From the stock price index by industry, not only it is possible to judge "stocks of which industry is bought currently", but also can judge that the stock market "expects decline in an interest", if interest-sensitive stocks of industries such as electric power, gas, ship building, and the like are being bought. The stock price index also indicates whether an object of selective buying is a large-capital stock (with the number of stocks issued equal to or larger than 200 million or more) or a small-capital stock (with the number of stocks issued less than 60 million) (see "Nyumon no Nyumon, 'Kabu' no Shikumi", Tomio Sugimura, Nippon Jitsugyo Publishing, Oct. 20, 2004, pp. 156 to 157).

However, in such a conventional stock index, Nikkei index and TOPIX are indexes significantly depending on a total stock price of a group of basic stocks. In the up-down radio, the 10 most-heavily traded issues, the trading unit price, the high rank stock ratio, the stock index by industry, and the like, characteristic matters to be watched are uncertain. Thus, all of these indexes lack accuracy in judging market sentiments such as a selling tendency or a buying tendency.

SUMMARY OF THE INVENTION

The invention has been devised in view of such a conventional problem and it is an object of the invention to provide a method of generating and displaying a stock index that is capable of generating and displaying an index suitable for accurately judging market sentiments such as a selling tendency or a buying tendency.

It is another object of the invention to provide a stock price chart display system according to a client/server system that is capable of displaying the stock index.

It is still another object of the invention to provide a computer program that is capable of realizing a server apparatus and a client machine suitable for constructing the stock price chart display system.

Other objects and technical effects of the invention will be readily understood by those skilled in the art with reference to the following descriptions in this specification.

In order to attain the objects, the invention provides (1) a method of generating and displaying a stock index, (2) a stock price chart display method and a stock price chart display system, (3) a computer program for constructing a server apparatus, and (4) a computer program for constructing a client machine, details of which are as described below.

The method of generating and displaying a stock index of the invention includes a first step, a second step, and a third step as described below.

The first step is a step of constructing a database including stock price information for a nearest predetermined maximum period concerning each of a group of stocks on the basis of stock price information provided from a stock price information issue source.

The second step is a step of executing an arithmetic operation for calculating a value of a Masuda ratio (Mratio) or a value substantially equivalent to the Masuda ratio (Mratio) on the basis of the stock price information on the database. The Masuda ratio (Mratio) is represented by the following formula;

$$Mratio=\{(B-E)/SUM\}\times 100$$

where SUM is a total number of stocks of a group of specific stocks forming a basis in generating one representative stock movement index, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 indicating an upward trend when the number of stocks is B, and E is the number of stocks, MA1, MA2, and MA3 having a magnitude relation MA1<MA2<MA3 indicating a downward trend when the number of stocks is E.

Nikkei index, TOPIX, and the like can be given as one representative stock movement index referred to above in the case of Japan, and the NASDAQ, DOW, SP500, and the like in the case of the United States.

The third step is a step of visualizing the value of the Masuda ratio (Mratio) or the value substantially equivalent to the Masuda ratio (Mratio) calculated by the arithmetic operation as an index representing market sentiments such as a degree of a buying tendency or a degree of a selling tendency.

The value substantially equivalent to the Masuda ratio (Mratio) means, for example, a ratio having a different appearance from the Masuda ratio while keeping an original meaning of the Masuda ratio such as a value obtained by multiplying the Masuda ratio (Mratio) by a fixed rate and a normalized value.

According to such a method, in addition to adoption of the group of specific stocks forming a basis in generating one representative stock movement index such as Nikkei index or TOPIX that originally tends to reflect market sentiments, a difference (B−E) between the number of stocks in the upward trend and the number of stocks in the downward trend in the six-color pattern classification proposed by the inventor is divided by the total number of the group of specific stocks (SUM). Thus, the value of the Masuda ratio (Mratio) generated in this way is less easily affected by a price difference among the respective stocks and accurately reflects the market sentiments such as a degree of buying tendency and a degree of selling tendency.

Therefore, if the value of the Masuda ratio obtained in this way is visualized, a user intending to trade stocks can accurately grasp timing for selling and buying while accurately grasping market sentiments at every moment.

As a form of visualization, it is possible to arbitrarily adopt various display forms such as display as numerical values, display as a Masuda ratio curve in time series, display as a Masuda ratio curve having different colors for positive and negative values, display of a predetermined upper limit threshold line (e.g., +70% to +80% line) and lower limit threshold line (e.g., −50% to −60% line) superimposed on the Masuda ratio curve, and automatic display of a "overheated" sign (e.g., a point when a stop price exceeds the upper limit threshold line) and a "quiet" sign (e.g., a point when a stock price falls below the lower limit threshold line) according to comparison of the value of the Masuda ratio and the upper and lower thresholds.

The stock price chart display system of the invention is realized as a client/server system in which the server apparatus and the client machine are connectable via the Internet.

The server apparatus includes a database constructing unit, a first arithmetic processing unit, a first storing unit, a second arithmetic operation unit, a second storing unit, a third arithmetic operation unit, a third storing unit, a first data transmitting unit, and a second data transmitting unit.

The data base constructing unit constructs a database including stock price information for a nearest predetermined maximum period concerning each of a group of stocks on the basis of stock price information acquired from a stock price information issue source via the Internet.

The first arithmetic operation unit executes, on the basis of stock price information of respective stocks determined in advance on the database, an arithmetic operation for calculating moving average deviations of stock prices in a short term, a medium term, and a long term nearest to a reference time in at least one time unit selected from day, week, and month, respectively.

The first storing unit stores a data sequence of the moving average deviations of the stock prices in the short term, the medium term, and the long term, which are calculated by the first arithmetic operation unit, for each of the stocks.

The second arithmetic operation unit executes, on the basis of the data sequence of the moving average deviations of the respective stocks stored in the first storing unit, an arithmetic operation for obtaining pattern classification codes indicating to which of six patterns determined in advance a relation among magnitudes of data on the moving average deviations of the stock prices in the short term, the medium term, and the long term is classified.

The second storing unit stores a sequence of the pattern classification codes obtained by the second arithmetic operation unit for each of the stocks.

The third arithmetic operation unit executes, on the basis of the sequence of the pattern classification codes of the respective stocks stored in the second storing unit, an arithmetic operation for obtaining data on the number of appearances for each of the pattern classification codes at each reference time concerning all the stocks included in the group of basic stocks in generating one representative stock movement index.

The third storing unit stores a sequence of the data on the number of appearances for each of the pattern classification codes obtained by the third arithmetic operation unit.

The first data transmitting unit reads out the data sequence of moving average deviations of the stock prices in the short term, the medium term, and the long term concerning one stock from the first storing unit and transmits the data sequence of moving average deviations to the client machine.

The second data transmitting unit reads out the data sequence of the number of appearances for each of the pattern classification codes concerning the group of basic stocks in generating one representative stock movement index from the third storing unit and transmits the data sequence of the number of appearances to the client machine.

The client machine includes a first storing unit, a second storing unit, a first arithmetic operation unit, a third storing unit, a first rendering processing unit, and a second rendering processing unit.

The first storing unit stores the data sequence of moving average deviations of the stock prices in the short term, the medium term, and the long term concerning one stock sent from the server apparatus.

The second storing unit stores the data sequence of the number of appearances for each of the pattern classification codes concerning the group of basic stocks in generating the one stock movement index sent from the server apparatus.

The first arithmetic operation unit executes, on the basis of the data sequence of the number of appearances for each of the pattern classification codes stored in the second storing unit, an arithmetic operation for calculating a value of a Masuda ratio (Mratio) or a value substantially equivalent to the Masuda ratio (Mratio). The Masuda ratio (Mratio) is represented by the following formula.

$$Mratio=\{(B-E)/SUM\}\times 100$$

where SUM is a total number of stocks included in the group of basic stocks, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is the number of stocks, MA1, MA2, and MA3 having a magnitude relation MA1<MA2<MA3 when the number of stocks is E.

The third storing unit stores a data sequence of the value of the Masuda ratio (Mratio) or the value substantially equivalent to the Masuda ratio (Mratio) calculated by the first arithmetic operation unit.

The first rendering processing unit displays Masuda candlestick curves in the short term, the medium term, and/or the long term concerning one stock on a predetermined area of a display screen on the basis of the data sequence of the moving average deviations of the stock prices in the short term, the medium term, and the long term stored in the first storing unit.

The second rendering processing unit displays a Masuda ratio curve concerning one stock on a predetermined area of the display screen on the basis of the data sequence of the value of the Masuda ratio (Mratio) or the value substantially equivalent to the Masuda ratio (Mratio) stored in the third storing unit.

According to such a constitution, the server apparatus performs all kinds of processing with large processing loads such as (1) processing for constructing a database including stock price information for a nearest predetermined maximum period concerning each of a group of stocks on the basis of stock price information acquired from a stock price information issue source via the Internet, (2) processing for executing, on the basis of stock price information of respective stocks predetermined in advance on the database, an arithmetic operation for calculating each of moving average deviations of stock prices in a short term, a medium term, and a long term nearest to a reference time in at least one time unit selected from day, week, and month, (3) processing for executing, on the basis of a data sequence of moving average deviations of each stock stored in the first storing unit, an arithmetic operation for obtaining a pattern classification code indicating to which of six patterns determined in advance a relation among magnitudes of data on the moving average deviations of the stock prices in the short term, the medium term, and the long term is classified, and (4) processing for executing, on the basis of a sequence of pattern classification codes for respective stocks stored in the second storing unit, an arithmetic operation for obtaining data on the number of appearances for each of the pattern classification codes at each reference time concerning all stocks included in a group of basic stocks in generating one representative stock movement index. Thus, processing loads on a personal computer, a PDA, and the like on a user side constituting the client machine are reduced. In addition, the sequence of pattern classification codes itself is not stored in the personal computer, the PDA, and the like at all. Thus, there is an advantage that various kinds of know-how on the server apparatus side are less easily leaked to the user side even when stock price information provision service is charged.

On the other hand, a personal computer, a PDA, a cellular phone, and the like of a user constituting the client machine can acquire (1) the data sequence of moving average deviations of stock prices in the short term, the medium term, and the long term, concerning one stock designated on the user side and (2) the data sequence of the number of appearances for each of the pattern classification codes concerning the group of basic stocks in generating one representative stock movement index. Thus, the user can simultaneously display, with time axes aligned, Masuda candlestick curves in a short term, a medium term, and/or a long term concerning one stock as well as Masuda ratio curves concerning the one stock on a predetermined area of a display screen simply by performing arithmetic processing with relatively small processing loads on the basis of the data.

Therefore, according to a form of displaying the Masuda candlestick curves and the Masuda ratio curves in parallel, the user can more accurately judge timing for selling and buying by grasping market sentiments on the basis of the Masuda ratio curves while simultaneously observing stock movements concerning specific stocks on the basis of the Masuda candlestick curves (the short term, the medium term, and/or the long term).

In the stock price chart display system, the client machine may further includes a third rendering processing unit that displays pattern distribution bars concerning all the stocks included in the group of basic stocks in a predetermined area of the display screen on the basis of the data sequence of the number of appearances for each of the pattern classification codes stored in the second storing unit.

According to the pattern distribution bars (e.g., colored for each bar) displayed on the screen in this way, the number of appearances of the respective six-color patterns (A pattern to F pattern) at each point on the time axis is intuitively grasped. The user can more accurately recognize market sentiments.

In the stock price chart display system, it is possible to grasp a series of processing procedures executed by the server apparatus and the client machine as a whole as a stock price chart display method. It goes without saying that this stock price chart display method itself effectively acts even if roles played by the server apparatus and the client machine are changed according to future development of the software technology, design changes, and the like.

A computer program for constructing the server apparatus constituting the client server system is constituted as described below.

This computer program is a computer program for causing a computer to function as a server apparatus including:

a data base constructing unit that constructs a database including stock price information for a nearest predetermined maximum period concerning each of a group of stocks on the basis of stock price information acquired from a stock price information issue source via the Internet;

a first arithmetic operation unit that executes, on the basis of stock price information of respective stocks determined in advance on the database, an arithmetic operation for calculating moving average deviations of stock prices in a short term, a medium term, and a long term nearest to a reference time in at least one time unit selected from day, week, and month, respectively;

a first storing unit that stores a data sequence of the moving average deviations of the stock prices in the short term, the medium term, and the long term, which are calculated by the first arithmetic operation unit, for each of the stocks;

a second arithmetic operation unit that executes, on the basis of the data sequence of the moving average deviations of the respective stocks stored in the first storing unit, an arithmetic operation for obtaining pattern classification codes indicating to which of six patterns determined in advance a relation among magnitudes of data on the moving average deviations of the stock prices in the short term, the medium term, and the long term is classified;

a second storing unit that stores a sequence of the pattern classification codes obtained by the second arithmetic operation unit for each of the stocks;

a third arithmetic operation unit that executes, on the basis of the sequence of the pattern classification codes of the respective stocks stored in the second storing unit, an arithmetic operation for obtaining data on the number of appearances for each of the pattern classification codes at each reference time concerning all the stocks included in the group of basic stocks in generating one representative stock movement index;

a third storing unit that stores a sequence of the data on the number of appearances for each of the pattern classification codes obtained by the third arithmetic operation unit;

a first data transmitting unit that reads out the data sequence of moving average deviations of the stock prices in the short term, the medium term, and the long term concerning one stock from the first storing unit and transmits the data sequence of moving average deviations to the client machine; and a second data transmitting unit that reads out the data sequence of the number of appearances for each of the pattern classification codes concerning the group of basic stocks in generating one representative stock movement index from the third storing unit and transmits the data sequence of the number of appearances to the client machine.

A first computer program for constructing the client machine constituting the client server system is constituted as described below.

This computer program is a compute program for causing a computer to function as a client machine including:

a first storing unit that stores data sequence of moving average deviations of stock prices in a short term, a medium term, and a long term concerning one stock sent from a server apparatus;

a second storing unit that stores data sequence of the number of appearances for each of pattern classification codes concerning a group of basic stocks in generating one stock movement index sent from the server apparatus;

a first arithmetic operation unit that executes, on the basis of the data sequence of the number of appearances for each of the pattern classification codes stored in the second storing unit, an arithmetic operation for calculating a value of a Masuda ratio (Mratio) or a value substantially equivalent to the Masuda ratio (Mratio), the Masuda ratio (Mratio) being represented by a formula Mratio=$\{(B-E)/SUM\}\times 100$, where SUM is a total number of stocks included in the group of basic stocks in generating one representative stock movement index, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is the number of stocks, MA1, MA2, and MA3 having a magnitude relation MA1<MA2<MA3 when the number of stocks is E;

a third storing unit that stores a data sequence of the value of the Masuda ratio (Mratio) or the value substantially equivalent to the Masuda ratio (Mratio) calculated by the first arithmetic operation unit;

a first rendering processing unit that displays Masuda candlestick curves in the short term, the medium term, and/or the long term concerning one stock on a predetermined area of a display screen on the basis of the data sequence of the moving average deviations of the stock prices in the short term, the medium term, and the long term stored in the first storing unit; and a second rendering processing unit that displays a Masuda ratio curve concerning one stock on a predetermined area of the display screen on the basis of the data sequence of the value of the Masuda ratio (Mratio) or the value substantially equivalent to the Masuda ratio (Mratio) stored in the third storing unit.

A second computer program for constructing the client machine constituting the client server system is constituted as described below.

This computer program is a compute program for causing a computer to function as a client machine including:

a first storing unit that stores data sequence of moving average deviations of stock prices in a short term, a medium term, and a long term concerning one stock sent from a server apparatus;

a second storing unit that stores data sequence of the number of appearances for each of pattern classification codes concerning a group of basic stocks in generating one stock movement index sent from the server apparatus;

a first arithmetic operation unit that executes, on the basis of the data sequence of the number of appearances for each of the pattern classification codes stored in the second storing unit, an arithmetic operation for calculating a value of a Masuda ratio (Mratio) or a value substantially equivalent to the Masuda ratio (Mratio), the Masuda ratio (Mratio) being represented by a formula Mratio=$\{(B-E)/SUM\}\times 100$, where SUM is a total number of stocks included in the group of basic stocks in generating one representative stock movement index, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is the number of stocks, MA1, MA2, and MA3 having a magnitude relation MA1<MA2<MA3 when the number of stocks is E;

a third storing unit that stores a data sequence of the value of the Masuda ratio (Mratio) or the value substantially equivalent to the Masuda ratio (Mratio) calculated by the first arithmetic operation unit;

a first rendering processing unit that displays Masuda candlestick curves in the short term, the medium term, and/or the long term concerning one stock on a predetermined area of a display screen on the basis of the data sequence of the moving average deviations of the stock prices in the short term, the medium term, and the long term stored in the first storing unit;

a second rendering processing unit that displays a Masuda ratio curve concerning one stock on a predetermined area of the display screen on the basis of the data sequence of the value of the Masuda ratio (Mratio) or the value substantially equivalent to the Masuda ratio (Mratio) stored in the third storing unit; and a third rendering processing unit that displays pattern distribution bars concerning all the stocks included in the group of basic stocks in a predetermined area of the display screen on the basis of the data sequence of the number of appearances for each of the pattern classification codes stored in the second storing unit.

According to the invention, in addition to adoption of the group of specific stocks forming a basis in generating one representative stock movement index that originally tends to reflect market sentiments, a difference (B–E) between the number of stocks in the upward trend and the number of stocks in the downward trend in the six-color pattern classification proposed by the inventor is divided by the total number of the group of specific stocks (SUM). Thus, the value of the Masuda ratio (Mratio) generated in this way is less easily affected by a price difference among the respective stocks and accurately reflects the market sentiments such as a degree of a buying tendency and a degree of a selling tendency. Therefore, if the value of the Masuda ratio obtained in this way is visualized, a user intending to trade stocks can accurately grasp timing for selling and buying while accurately grasping market sentiments at every moment. It is also possible to accurately grasp movements of marketable securities that are traded in the same manner as stocks such as Exchange-Traded Funds (ETF) associated with Tokyo Stock Exchange Price Index (TOPIX), Nikkei 225 stock index, and the like.

BRIEF DESCRIPTION OF THE DRAWINGS

FIG. 3 is a block diagram showing a constitution of a client apparatus;

FIG. 4 is a diagram showing an example of stock price information;

FIG. 5 is a diagram showing data content stored in a candle stick data storing unit;

FIG. 6 is a diagram for explaining content of data stored in six-color patterns;

FIG. 7 is a diagram for explaining content of data stored in a number-of-appearances-by-pattern storing unit;

FIGS. 8A and 8B are diagrams for explaining content of data stored in a Masuda ratio storing unit;

DETAILED DESCRIPTION OF THE PREFERRED EMBODIMENTS

Figure 1:
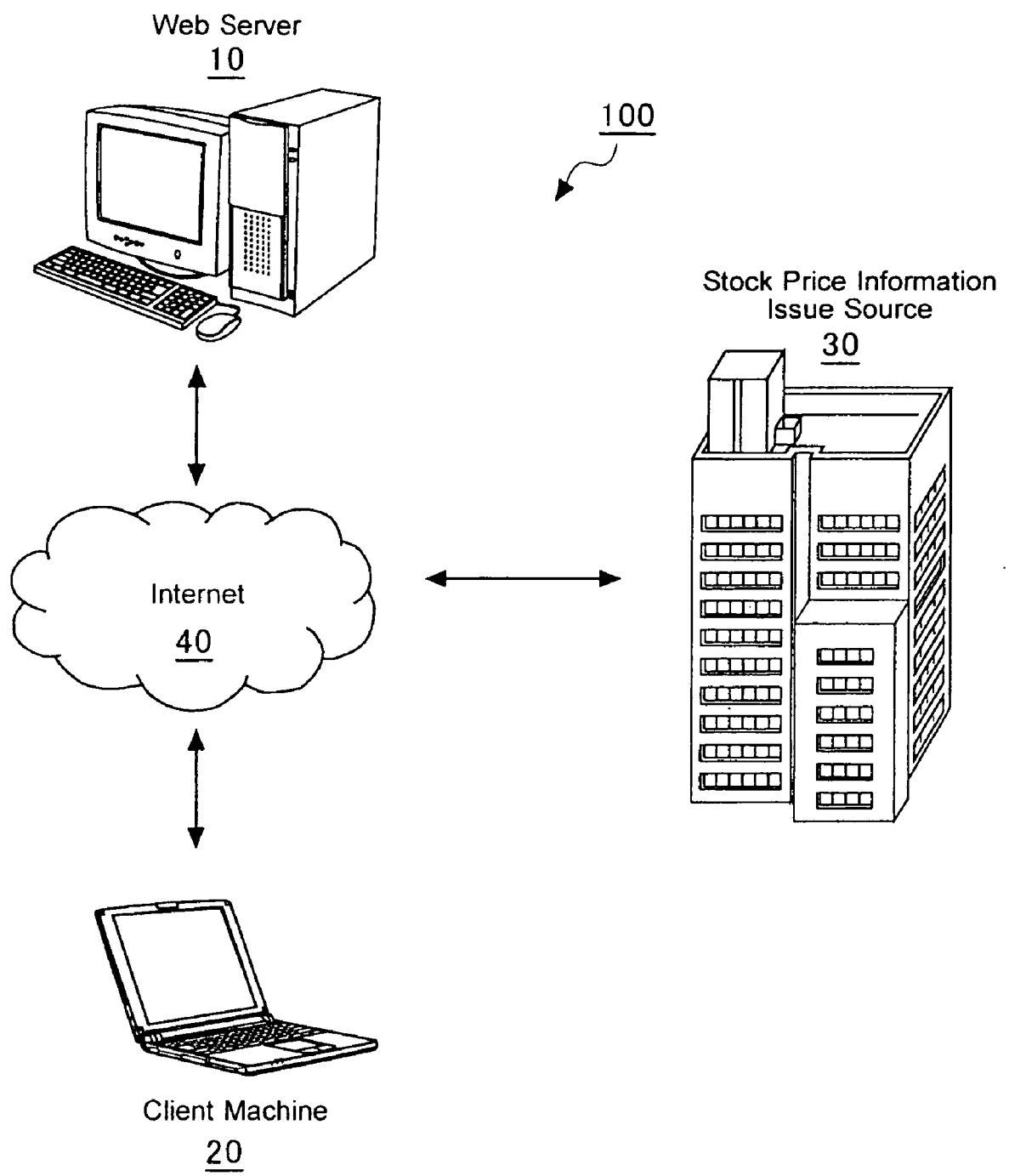
FIG. 1 is a diagram of a stock price chart generation system to which the invention is applied.

A preferred embodiment of the invention will be hereinafter explained in detail with reference to the accompanying drawings. A diagram of a stock price chart display system according to a client/server system, which is an embodiment of the invention, is conceptually shown in a block diagram in FIG. 1.

As shown in the figure, in the stock price chart display system 100, a server apparatus (a Web server) 10 and a client machine (e.g., a personal computer, a PDA, or a cellular phone) 20 are connectable via the Internet 40. In the figure, reference numeral 30 denotes a stock price information issue source such as a stock exchange.

Figure 2:
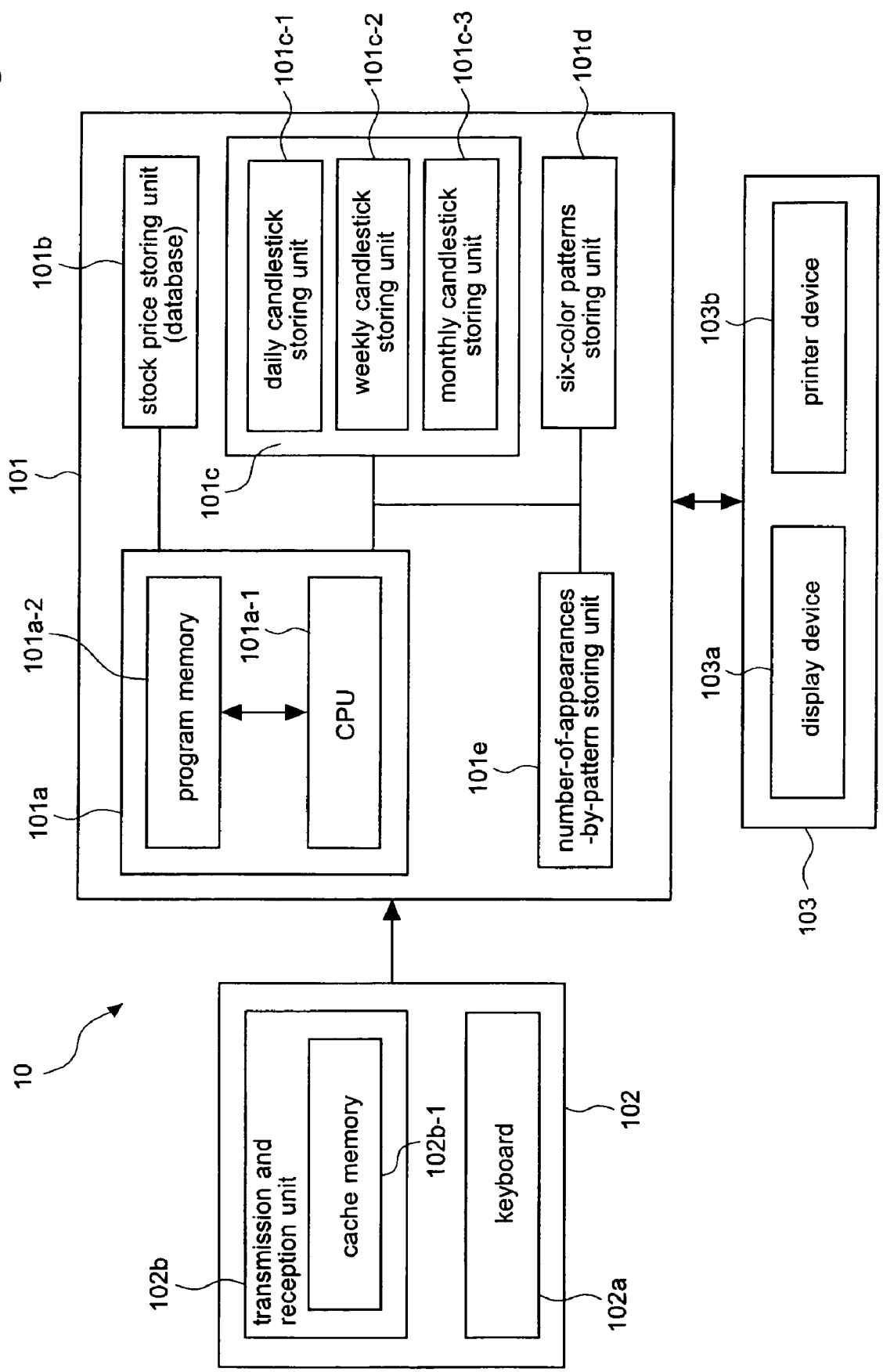
FIG. 2 is a block diagram showing a constitution of a server apparatus.

FIG. 2 is a block diagram showing a constitution of the server apparatus 10. As shown in the figure, the server apparatus 10 includes a main body unit 101, an input unit 102, and an output unit 103.

The main body unit 101 includes a central processor 101a, a stock price storing unit 101b, a candlestick data storing unit 101c, a six-color pattern storing unit 101d, and a number-of-appearances-by-pattern storing unit 101e.

The central processor 101a includes a program memory 101a-2 that stores computer programs required for realizing functions as a server apparatus and a CPU 101a-1 that realizes various functions as the server apparatus by properly reading and executing the computer programs stored in the program memory 101a-2. Examples of the computer programs stored in the program memory 101a-2 include various computer programs that will be explained later with reference to flowcharts in FIGS. 10 to 14.

In this embodiment, the stock price storing unit 101b is realized by partial allocation of a storage area of a hard disk provided in the server apparatus 10. A database including stock price information for a nearest predetermined maximum period concerning each of a group of stocks determined in advance is stored in the stock price information storing unit 101b. As explained later, this database is constructed on the basis of stock price information (in this embodiment, the stock price information includes about 1660 stocks in the first section of the Tokyo Stock Exchange) acquired from the stock price information issue source 30 via the Internet according to an action of a transmission and reception unit 102b constituting the input unit 102.

An example of stock price information included in the database stored in the stock price storing unit 101b is shown in FIG. 4. As shown in the figure, this stock price information is constituted by a "date" when the stock price information is acquired, an "opening price", a "highest price", a "lowest price", a "closing price", and a "trading volume" are stored as data for one day in association with one stock. The "date" is referred to in specifying stock prices (closing prices) of the day, the previous day, and two days before when, for example, a short term closing average price is calculated in a daily candlestick.

In this embodiment, daily candlestick (closing price) data for latest 450 days is used for creation of a daily candlestick, weekly candlestick (closing price) data for latest 192 weeks is used for creation of a weekly candlestick, and monthly candlestick (closing price) data for latest 176 months is used for creation of a monthly candlestick. Therefore, stock price information for at least a predetermined maximum number of days (N days) required for performing arithmetic operations for creating these candlesticks is stored in the stock price storing unit 101b.

The candlestick data storing unit 101c includes a daily candlestick storing unit 101c-1 that stores candlestick data required for rendering Masuda candlestick curves in a short term, a medium term, and a long term of a daily candlestick, a weekly candlestick storing unit 101c-2 that stores candlestick data required for rendering Masuda candlestick curves in a short term, a medium term, and a long term of a weekly candlestick, and a monthly candlestick storing unit 101c-3 that stores candlestick data required for rendering Masuda candlestick curves in a short term, a medium term, and a long term of a monthly candlestick.

Contents of the candlestick data stored in the daily candlestick storing unit 101c-1, the weekly candlestick storing unit 101c-2, and the monthly candlestick storing unit 101c-3 of the candlestick data storing unit 101c, respectively, are shown in FIG. 5.

As shown in the figure, average closing prices in the short term, the medium term, and the long term in third to Dth days (assuming that Dth day is a latest day) and closing prices of the respective days (present closing prices) are stored for each stock in the daily candlestick storing unit 101c-1 together with dates of the respective days.

The "date" is a day serving as a reference for calculation of daily candlestick data. For example, when a short term average closing price in the daily candlestick is calculated, a day corresponding to the third day (if the day is July 10, stock prices (closing prices) on July 9 and 8 are required for an arithmetic operation and, in this case, July 10 that is a day when the short term average closing price is calculated) is stored.

A head of the data is the "third day" because average closing prices for two preceding days are required for calculation of a short term average closing price as daily candlestick data. Due to the same reason, a medium term average closing price is stored after a twenty-fifth day and a long term average closing price is stored after a seventy-fifth day.

Average closing prices in the short term, the medium term, and the long term from third to Wth weeks and closing prices of the respective weeks (closing prices of last days of the weeks) are stored for each stock in the weekly candlestick storing unit 101c-2 together with dates.

The "date" is a day serving as a reference for calculation of weekly candlestick data. For example, when a short term average closing price in the weekly candlestick is calculated, a day corresponding to the third week (if the day is July 10, stock prices (closing prices) on July 2 corresponding to the last week and June 25 corresponding to the week before last are required for an arithmetic operation and, in this case, July 10 that is a day when the average closing price is calculated) is stored.

A head of the data is the "third week" because average closing prices for two preceding weeks are required for calculation of a short term average closing price as weekly candlestick data. Due to the same reason, a medium term average closing price is stored after a thirteenth week and a long term average closing price is stored after a twenty-sixth week.

Average closing prices in the short term, the medium term, and the long term from third to Mth months and closing prices of the respective months (closing prices of last days of the months) are stored for each stock in the monthly candlestick storing unit 101a-3 together with dates.

The "date" is a day serving as a reference for calculation of monthly candlestick data. For example, when a short term average closing price in the monthly candlestick is calculated, a day corresponding to the third month (if the day is July 31, stock prices (closing prices) on June 30 corresponding to the last month and May 31 corresponding to the month before last are required for an arithmetic operation and, in this case, July 31 that is a day when the average closing price is calculated) is stored.

A head of the data in the monthly candlestick storing unit is the "third month" because average closing prices for two preceding months are required for calculation of a short term average closing price as monthly candlestick data. Due to the same reason, a medium term average closing price is stored after a twelfth month and a long term average closing price is stored after a thirty-sixth month.

Referring back to FIG. 2, a sequence of pattern classification codes obtained as a result of executing, on the basis of the respective average price data sequences of the daily candlestick, the weekly candlestick, and the monthly candlestick of the respective stocks stored in the candlestick data storing unit 101c, an arithmetic operation for obtaining a pattern classification code indicating to which of six kinds of patterns determined in advance a magnitude relation among moving average deviation data of stock prices in the short term, the medium term, and the long term is classified is stored in the six-color pattern storing unit 101d for each of the stocks and for each of the daily candlestick, the weekly candlestick, and the monthly candlestick.

FIG. 6 is a diagram for explaining content of data stored in the six-color pattern storing unit 101d. In the figure, for convenience of explanation, only a sequence of pattern classification codes concerning the weekly candlestick is illustrated. However, the same explanation applies to the daily candlestick and the monthly candlestick.

As shown in the figure, W storing sections corresponding to first to Wth weeks are provided in storage areas (stock No. 1 to stock No. n) for the respective stocks. A pattern classification code indicating to which of six kinds of classification patterns (a pattern A, a pattern B, a pattern C, a pattern D, a pattern E, and a pattern F) determined in advance a magnitude relation among (moving) average deviations in the short term, the medium term, and the long term of the weekly candlestick in the week corresponds is stored in each of the storing sections.

As explained earlier, when MA1 is a short term moving average deviation, MA2 is a medium term moving average deviation, and MA3 is a long term moving average deviation, the respective patterns constituting the six-color patterns have meanings as described below.

Pattern A: (MA1>MA3>MA2): Entrance of an upward trend
Pattern B: (MA1>MA2>MA3): Upward trend
Pattern C: (MA2>MA1>MA3): Crash of the upward trend
Pattern D: (MA2>MA3>MA1): Entrance of a downward trend
Pattern E: (MA3>MA2>MA1): Downward trend
Pattern F: (MA3>MA1>MA2): End of the downward trend In this way, a close correlation is recognized between the magnitude relation among the moving average deviations in the short term (MA1), the medium term (MA2), and the long term (MA3) and the stock price trends. This is learned for the first time by Mr. Masuda Tokutaro, who is the inventor of the invention as claimed in this application, as a result of earnest researches.

Figure 9:
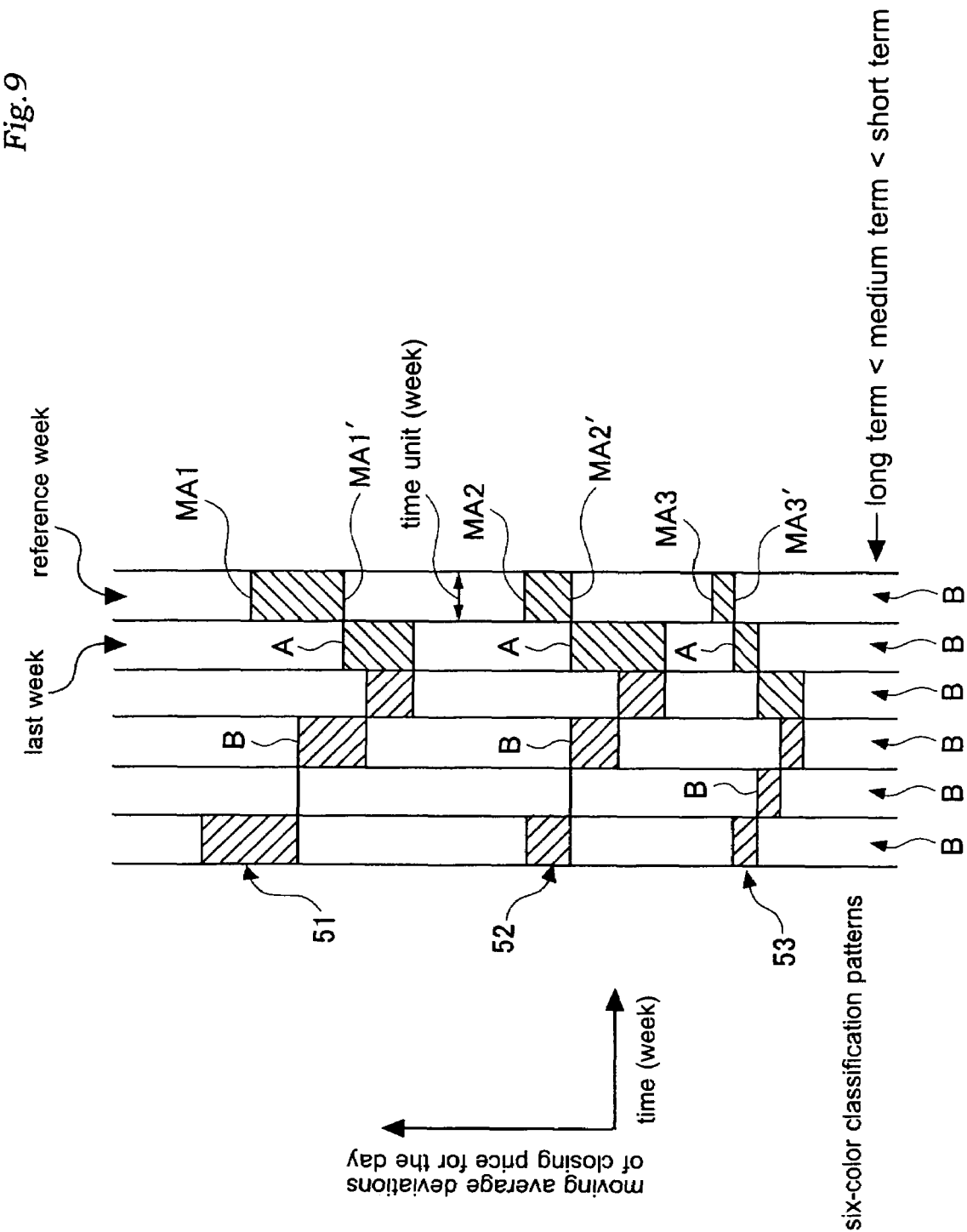
FIG. 9 is a diagram for explaining a magnitude relation and a relation with six-color patterns of moving average lines (long term, medium term, and short term) of a weekly candlestick.

FIG. 9 is a diagram for explaining a relation between the magnitude relation among the moving average deviations (the long term, the medium term, and the short term) of the weekly candlestick and the six-color patterns. In the figure, reference numeral 51 denotes a short term Masuda candlestick curve; 52, a medium Masuda candlestick curve; and 53, a long term Masuda candlestick curve. Reference signs MA1 denotes an average price of three weeks nearest to a reference week; MA1', an average price of three weeks nearest to the last week; MA2, an average price of thirteen weeks nearest to the reference week; MA2', an average price of thirteen weeks nearest to the last week; MA3, an average price of twenty-six weeks nearest to the reference week; MA3', an average price of twenty-six weeks nearest to the last week; A, a pink candlestick; and B, a blue candlestick. In the example shown in the figure, since a magnitude relation of (MA1>MA2>MA3) is recognized, values of the six-color classification pattern codes are "B" for all the "weeks".

Referring back to FIG. 2 again, a data sequence of the number of appearances for each of pattern classification codes obtained by executing, on the basis of the sequence of pattern classification codes of the respective stocks stored in the six-color pattern storing unit 101d, an arithmetic operation for obtaining data on the number of appearances of each of the pattern classification codes at each reference time concerning all stocks included in a group of basic stocks in generating one representative stock movement index such as Nikkei index or TOPIX is stored in the number-of-appearances-by-pattern storing unit 101e for at least one of the daily candlestick, the weekly candlestick, and the monthly candlestick (in this example, the weekly candlestick).

FIG. 7 is a diagram for explaining content of data stored in the number-of-appearances-by-pattern storing unit 101e. In the figure, for convenience of explanation, only a data sequence of the number of appearances of each of pattern classification codes concerning the weekly candlestick is illustrated. However, the same explanation applies to the daily candlestick and the monthly candlestick.

As shown in the figure, W storing sections corresponding to first to Wth weeks are provided in storing areas for respective classification patterns (a pattern A to a pattern F). The numbers of appearances of the respective classification patterns in the week are stored in the respective storing sections. Specifically, for the first week, the number of appearances of the pattern A is stored as A1, the number of appearances of the pattern B is stored as B1, the number of appearances of the pattern C is stored as C1, the number of appearances of the pattern D is stored as D1, the number of appearances of the pattern E is stored as E1, and the number of appearances of the pattern F is stored as F1. For the second week, the number of appearances of the pattern A is stored as A2, the number of appearances of the pattern B is stored as B2, the number of appearances of the pattern C is stored as C2, the number of appearances of the pattern D is stored as D2, the number of appearances of the pattern E is stored as E2, and the number of appearances of the pattern F is stored as F2. Similarly, for the nth week, the number of appearances of the pattern A is stored as An, the number of appearances of the pattern B is stored as Bn, the number of appearances of the pattern C is stored as Cn, the number of appearances of the pattern D is stored as Dn, the number of appearances of the pattern E is stored as En, and the number of appearance of the pattern F is stored as Fn.

Referring back to FIG. 2 again, a keyboard 102a, the transmission and reception unit 102b, and a not-shown pointing device such as a mouse are included in the input unit 102. The keyboard 102a is used for registration of company information, random input of stock price information of the company, and the like. The keyboard 102a is also used for inputting, when a chart of a desired stock is displayed on a display device 103a serving as the output unit 103 described later, a name (or, for convenience, a stock code) of the stock.

The number of stocks handled at the stock price information issue source 30 is as many as about 4800 including OTC stocks. When the stock price information is manually inputted from the keyboard 102a after three o'clock in the afternoon when closing prices are announced, enormous time and labor are required. Moreover, input mistakes are inevitable. Therefore, the transmission and reception unit 102b for acquiring stock price information provided from the stock price information issue source 30, for example, a stock exchange, via the Internet 40 on-line is provided. A cache memory 102c is used as a temporary memory for the stock information acquired via the transmission and reception unit 102b.

The output unit 103 includes the display device 103a and a printer device 103b connected to the main body unit 101. The display device 103a and the printer device 103b displays and prints, in accordance with the programs stored in the program memory 101a-2 included in the processing unit 101a, an input screen for inputting stock prices and information on the stock prices from the input unit 102, respectively. The display device 103a and the printer device 103b also displays and prints Masuda candlestick curves, pattern distribution bars, Masuda ratio curves, and the like in the short term, the medium term, and the long term concerning the daily candlestick, the weekly candlestick, and the monthly candlestick, respectively, on the basis of the respective data of the daily candlestick, the weekly candlestick, and the monthly candlestick stored in the candlestick data storing unit 101c, the sequence of pattern classification codes of the daily candlestick, the weekly candlestick, and the monthly candlestick concerning the respective stocks stored in the six-color pattern storing unit 101d, and the data sequence of the number of appearances for each pattern stored in the number-of-appearances-by-pattern storing unit 101e.

Operations for displaying and printing Masuda candlestick curves, pattern distribution bars, Masuda ratio curves, and the like are the same as operations in the client machine. Thus, the operations will be explained concerning the client machine.

The client machine (e.g., a personal computer, a PDA, or a cellular phone) 20 will be explained. FIG. 3 is a block diagram showing a constitution of the client machine 20.

As shown in the figure, the client machine 20 includes a main body unit 201, an input unit 202, and an output unit 203.

The main body unit 201 includes a central processor 201a, a candlestick data storing unit 201b, a number-of-appearances-by-pattern storing unit 201c, and a Masuda ratio storing unit 201d.

The central processor 201a includes a program memory 201a-2 that stores computer programs required for realizing functions as the client machine and a CPU 201a-1 that realizes various functions as the client machine by properly reading out and executing the computer programs stored in the program memory 201a-2. Examples of the computer programs stored in the program memory 201a-2 include various computer programs explained later with reference to flowcharts in FIGS. 15 to 19.

The candlestick data storing unit 201b includes, for one or more stocks transmitted from the server apparatus 10 in response to a transmission request from the client machine 20, a daily candlestick storing unit 201b-1 that stores candlestick data required for rendering Masuda candlestick curves in a short term, a medium term, and a long term of a daily candlestick, a weekly candlestick storing unit 201b-2 that stores candlestick data required for rendering Masuda candlestick curves in a short term, a medium term, and a long term of a weekly candlestick, and a monthly candlestick storing unit 201b-3 that stores candlestick data required for rendering Masuda candlestick curves in a short term, a medium term, and a long term of a monthly candlestick.

Contents of the candlestick data stored in the daily candlestick storing unit 201b-1, the weekly candlestick storing unit 201b-2, and the monthly candlestick storing unit 201b-3 of the candlestick data storing unit 201b, respectively, are basically the same as the contents of the candlestick data stored in the daily candlestick storing unit 101c-1, the weekly candlestick storing unit 101c-2, and the monthly candlestick storing unit 101c-3 of the server apparatus 10 explained with reference to FIG. 5. Thus, explanations of the contents are omitted.

A data sequence of the number of appearances of each of pattern classification codes concerning a group of basic stocks in generating one stock movement index (e.g., Nikkei 225 or TOPIX) sent from the server apparatus is stored in the number-of-appearances-by-pattern storing unit 201c.

Contents of the data sequence of the number of appearances for each of the patterns stored in the number-of-appearances-by-pattern storing unit 201c are basically the same as the contents of the number-of-appearances-by-pattern storing unit 101e of the server apparatus 10 explained with reference to FIG. 7. Thus, explanations of the contents are omitted.

A data sequence of a value of a Masuda ratio (Mratio) or a value substantially equivalent to the Masuda ratio (Mratio) is stored in the Masuda ratio storing unit 201d. The data sequence is obtained as a result of executing, on the basis of the data sequence of the number of appearances for each of the pattern classification codes stored in the number-of-appearances-by-pattern storing unit 201c, an arithmetic operation for obtaining a data sequence of a value of a Masuda ratio (Mratio) or a value substantially equal to the Masuda ratio (Mratio). The Masuda ratio (Mratio) is represented by the following formula.

$$M\text{ratio} = \{(B-E)/\text{SUM}\} \times 100$$

where SUM is a total number of stocks included in the group of specific stocks, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is the number of stocks, MA1, MA2, and MA3 having a magnitude relation MA1<MA2<MA3 when the number of stocks is E.

FIGS. 8A and 8B are diagrams for explaining content of data stored in the Masuda ratio storing unit 201d. FIG. 8A is a weekly candlestick Masuda ratio corresponding to Nikkei 225 and FIG. 8B is a weekly candlestick Masuda ratio corresponding to TOPIX.

As shown in the figure, in both the Masuda ratios corresponding to Nikkei 225 and TOPIX, W storing sections corresponding to first to Wth weeks are provided. A data sequence equivalent to the Masuda ratio (Mratio) calculated by the above formula is stored in each of the storing sections. In the case of an example shown in the figure, for example, in the weekly candlestick Masuda ratio corresponding to Nikkei 225, +70(%), +65(%), +60(%), +59(%), +55(%), +54(%), +53(%), −30(%), and −21(%) are stored for the first week, the second week, the third week, the fourth week, the fifth week, the sixth week, the seventh week, the W−1th week, and the Wth week, respectively. In the weekly candlestick Masuda ratio corresponding to TOPIX, +69(%), +64(%), +59(%), +55(%), +53(%), +51(%), +51(%), −29(%), and −20(%) are stored for the first week, the second week, the third week, the fourth week, the fifth week, the sixth week, the seventh week, the W−1th week, and the Wth week, respectively.

Referring back to FIG. 3, the input unit 202 includes a keyboard 202a, a transmission and reception unit 202b, and a not-shown pointing device such as a mouse. The keyboard 202a is used for applying various kinds of instruction operation from the client machine 20 to the server apparatus 10. The instruction operation includes stock designating operation for requesting transmission, operation for designating candlestick types such as a daily candlestick, a weekly candlestick, and a monthly candlestick, operation for designating averaged periods such as a short term, a medium term, and a long term, operation for requesting transmission of data on the number of appearances of each pattern, and operation for requesting display of a Masuda ratio. The transmission and reception unit 202b is used for communication between the client machine 20 and the server apparatus 10 through the Internet.

The output unit 203 includes a display device 203a and the printer device 203b connected to the main body unit 201. The display device 203a and the printer device 203b are used for displaying and printing Masuda candlestick curves, pattern distribution bars, Masuda ratio curves, and the like in the short term, the medium term, and the long term concerning the daily candlestick, the weekly candlestick, and the monthly candlestick, respectively, on the basis of the respective data of the daily candlestick, the weekly candlestick, and the monthly candlestick stored in the candlestick data storing unit 201b, the data sequence of the number of appearances of each pattern stored in the number-of-appearances-by-pattern storing unit 201c, and the data sequence of Masuda ratio stored in the Masuda ratio storing unit 201d.

Figure 10:
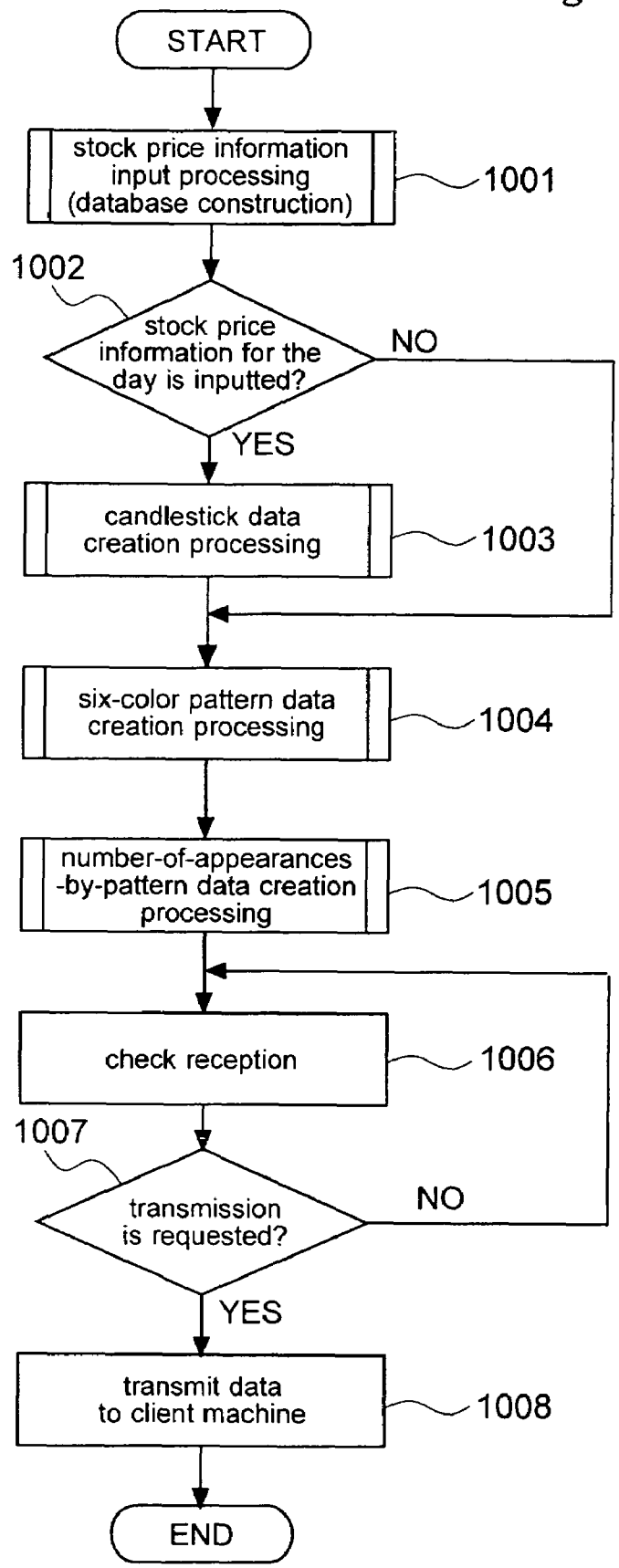
FIG. 10 is a schematic flowchart showing operation details of a server apparatus.
Figure 11:
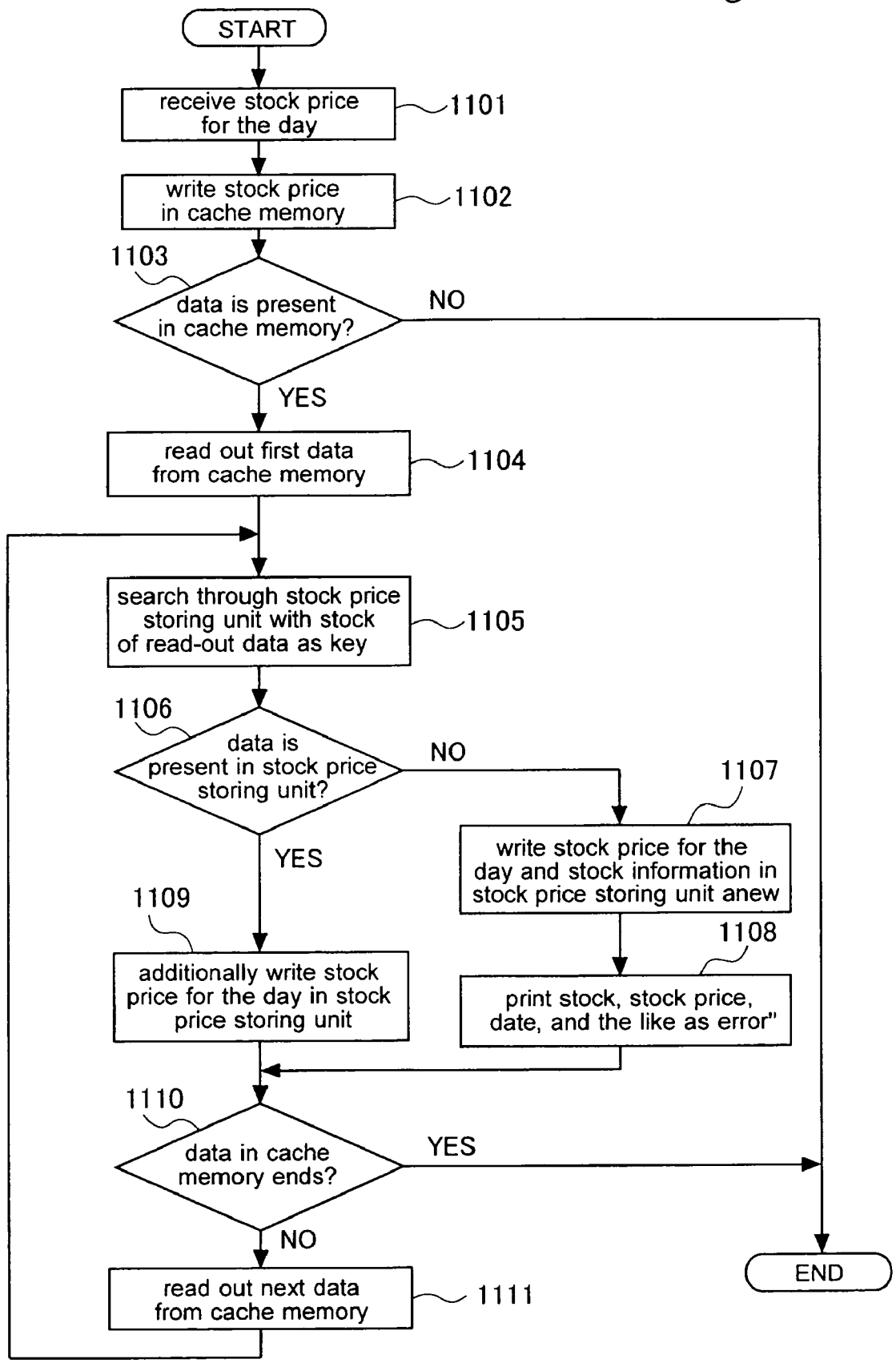
FIG. 11 is a flowchart showing details of stock price information input processing.

A software configuration of the server apparatus 10 will be explained. FIG. 10 is a schematic flowchart showing operation details of the server apparatus 10.

In the figure, when processing is started, first, the server apparatus 10 executes stock price information input processing (step 1001) in order to construct a database. Details of the stock price information input processing (step 1001) are shown in a flowchart in FIG. 11.

As shown in the figure, in the stock price input processing, first, the server apparatus 10 receives a stock price of the day via the Internet (step 1101), writes the stock price in the cache memory 102b-1 (step 1102), and, then, checks whether data is present in the cache memory 102b-1 (step 1103).

If data is present in the cache memory 102b-1 (YES in step 1103), the server apparatus 10 reads out first data from the cache memory 102b-1 (step 1104) and searches through the stock price storing unit 101b with a stock of the data read out as a key (step S1105).

If the data is present in the stock price storing unit 101b (YES in step 1106), the server apparatus 10 additionally writes the stock price of the day in the stock price storing unit 101b (step 1109). On the other hand, if the data is not present in the stock price storing unit 101b (NO in step 1106), the server apparatus 10 writes the stock price of the day and stock information in the stock price storing unit 101b anew (step 1107) and, then, prints the stock, the stock price, a date, and the like as an error (step 1108).

The server apparatus 10 repeatedly executes the operations (steps 1105 to 1109) every time data is read out from the cache memory 102b-1 one after another (step 1111) until no data is left in the cache memory 102b-1 (NO in step 1110).

Consequently, a database including stock price information for a nearest predetermined maximum period concerning each of a group of stocks is constructed in the stock price storing unit 101b on the basis of stock price information acquired from a stock price information issue source via the Internet (see FIG. 4).

Figure 12:
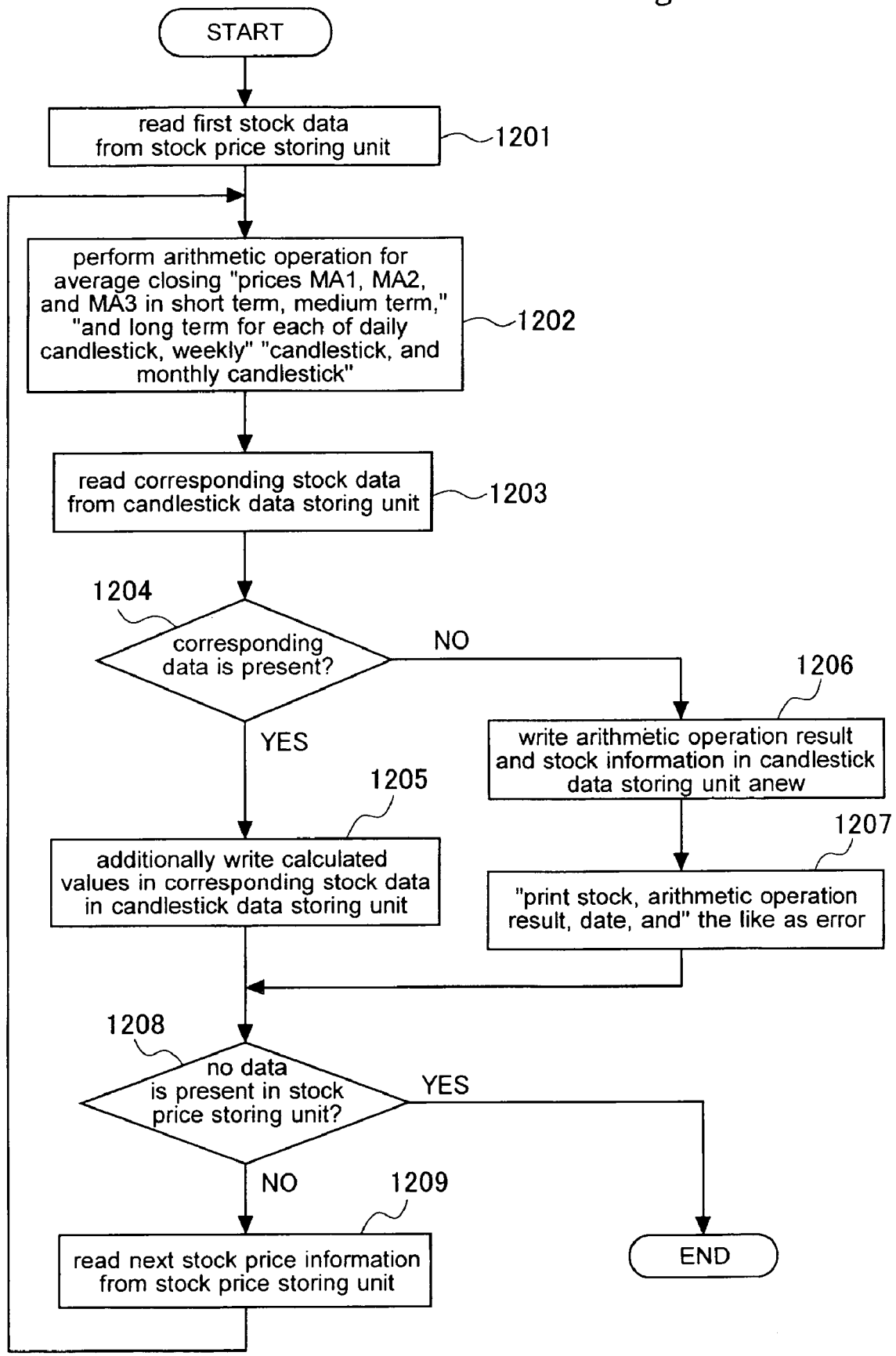
FIG. 12 is a flowchart showing details of candlestick data creation processing.

Referring back to FIG. 10, when the stock price information input processing (step 1001) ends, subsequently, the server apparatus 10 executes candlestick data creation processing (step 1003) on condition that stock price information for the day is inputted (YES in step 1002). FIG. 12 is a flowchart showing details of the candlestick data creation processing (step 1003).

As shown in the figure, in the candlestick data creation processing, first, the server apparatus 10 reads out data of a first stock from the stock price storing unit 101b (step 1201) and, then, calculates closing average moving deviations in a short term, a medium term, and a long term (MA1, MA2, and MA3) for a daily candlestick, a weekly candlestick, and a monthly candlestick on the basis of the data of the stock (step 1202).

Thereafter, the server apparatus 10 reads out relevant stock data from the candlestick data storing unit 101c (step 1203) and judges presence or absence of relevant data (step 1204). When it is judged that relevant data is present (YES in step 1204), the server apparatus 10 additionally writes the arithmetic operation values (MA1, MA2, and MA3) in the stock data of the candlestick data storing unit (step 1205). On the other hand, when it is judged that the relevant data is not present (NO in step 1204), the server apparatus 10 writes the arithmetic operation values (MA1, MA2, and MA3) and stock information in the candlestick data storing unit anew (step 1206) and prints the stock, the arithmetic operation result, a date, and the like as an error (step 1207).

The server apparatus 10 executes the operations (steps 1202 to 1207) every time data is read out from the stock price storing unit 101b one after another (step 1209) until no data is left in the stock price storing unit 101b (NO in step 1208).

Consequently, a data sequence of moving average deviations of stock prices in a short term, a medium term, and a long term calculated as a result of executing, on the basis of stock price information of respective stocks determined in advance on the database, an arithmetic operation for calculating moving average deviations of stock prices in a short term, a medium term, and a long term nearest to a reference time in at least one time unit selected from day, week, and month is stored in the candlestick data storing unit 101c for each of the stocks (see FIG. 5).

Figure 13:
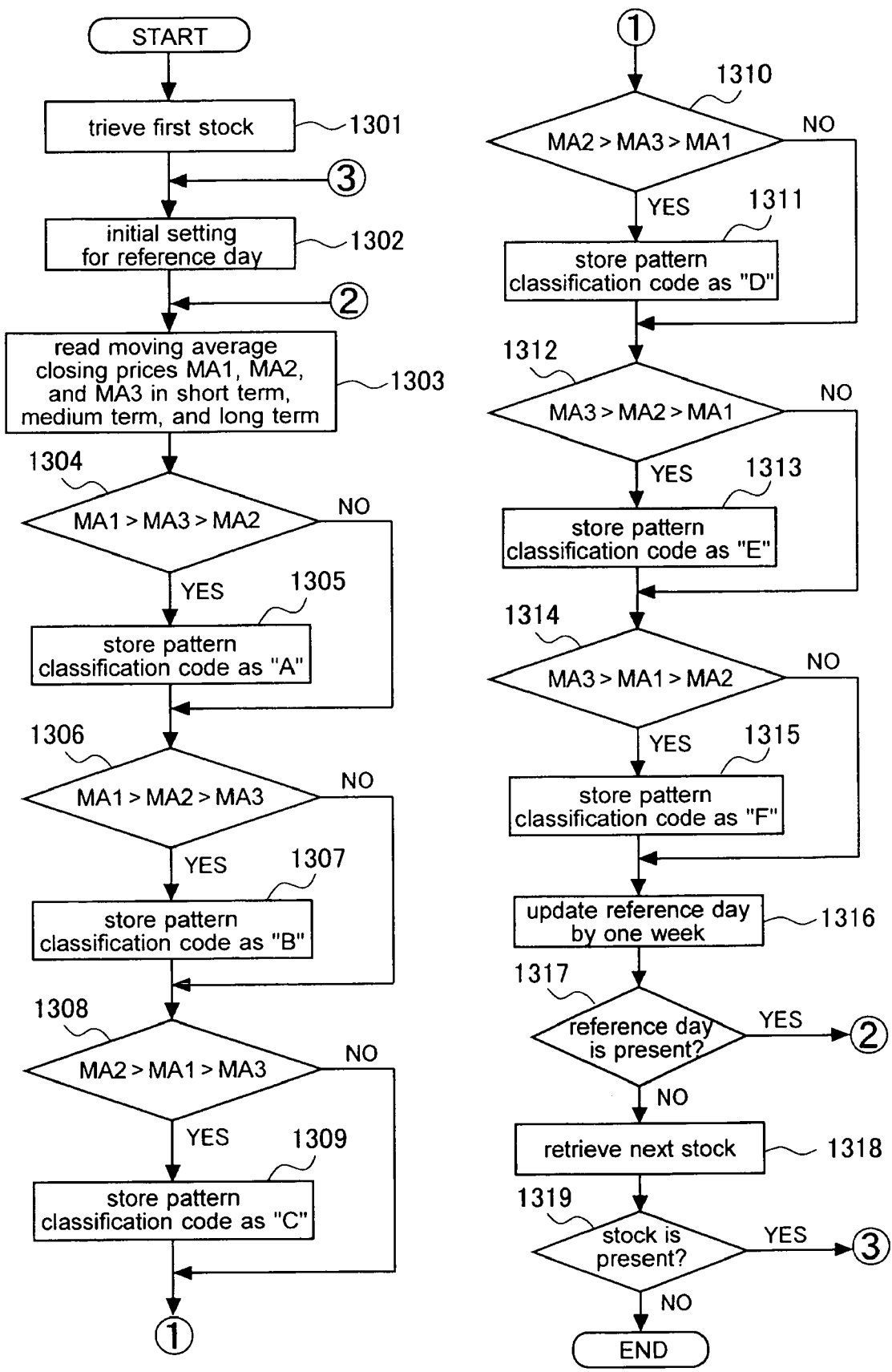
FIG. 13 is a flowchart showing details of six-color pattern data creation processing.

Referring back to FIG. 10 again, when the candlestick data creation processing (step 1003) ends, subsequently, the server apparatus 10 executes six-color pattern data creation processing (step 1004). FIG. 13 is a flowchart showing details of the six-color pattern data creation processing.

As shown in the figure, in the six-color pattern data creation processing, the server apparatus 10 retrieves a first stock from the candlestick data storing unit 101c (step 1301) and, then, performs initial setting for a reference date (step 1302). The server apparatus 10 reads the closing average moving deviations in the short term, the medium term, and the long term (MA1, MA2, and MA3) (step 1303).

Thereafter, the server apparatus 10 collates a magnitude relation among the closing moving average deviations in the short term, the medium term, and the long term (MA1, MA2, and MA3) read out with six kinds of reference magnitude relation patterns prepared in advance (steps 1304, 1306, 1308, 1310, 1312, and 1314).

When the magnitude relation among the read-out closing moving average deviations in the short term, the medium term, and the long term (MA1, MA2, and MA3) coincide with a reference magnitude relation pattern (MA1>MA3>MA2) prepared in advance (YES in step 1304), the server apparatus 10 stores a pattern classification code as "A" in the six-color pattern storing unit 101d (step 1305). Similarly, when the magnitude relation among the read-out closing moving average deviations in the short term, the medium term, and the long term (MA1, MA2, and MA3) coincide with a reference magnitude relation pattern (MA1>MA2>MA3) (YES in step 1306), the server apparatus 10 stores a pattern classification code as "B" in the six-color pattern storing unit 101d (step 1307). When the magnitude relation among the read-out closing moving average deviations in the short term, the medium term, and the long term (MA1, MA2, and MA3) coincide with a reference magnitude relation pattern (MA2>MA1>MA3) (YES in step 1308), the server apparatus 10 stores a pattern classification code as "C" in the six-color pattern storing unit 110d (step 1309). When the magnitude relation among the read-out closing moving average deviations in the short term, the medium term, and the long term (MA1, MA2, and MA3) coincide with a reference magnitude relation pattern (MA2>MA3>MA1) (YES in step 1310), the server apparatus 10 stores a pattern classification code as "D" in the six-color pattern storing unit 101d (step 1311). When the magnitude relation among the read-out closing moving average deviations in the short term, the medium term, and the long term (MA1, MA2, and MA3) coincide with a reference magnitude relation pattern (MA3>MA2>MA1) (YES in step 1312), the server apparatus 10 stores a pattern classification code as "E" in the six-color pattern storing unit 101d (step 1313). When the magnitude relation among the read-out closing moving average deviations in the short term, the medium term, and the long term (MA1, MA2, and MA3) coincide with a reference magnitude relation pattern (MA3>MA1>MA2) (YES in step 1314), the server apparatus 10 stores a pattern classification code as "F" in the six-color pattern storing unit 101d (step 1315).

The server apparatus 10 repeatedly executes the operations (steps 1303 to 1315) while updating the reference date by one week (because of the weekly candlestick) (step 1316). Then, the server apparatus 10 waits for the processing to reach a latest reference date (NO in step 1317) and, while changing the stock to the next stock (step 1318), repeatedly executes the operations (steps 1302 to 1316) up to a last stock (NO in step 1319).

Consequently, a code sequence of pattern classification codes obtained as a result of executing, on the basis of the data sequence of average moving deviations of each stock stored in the candlestick data storing unit 101c, an arithmetic operation for obtaining a patter classification code indicating to which of six kinds of patterns determined in advance a magnitude relation among moving average deviation data of stock prices in a short term, a medium term, and a long term is classified is stored in the six-color pattern storing unit 101d for each stock (see FIG. 6).

Figure 14:
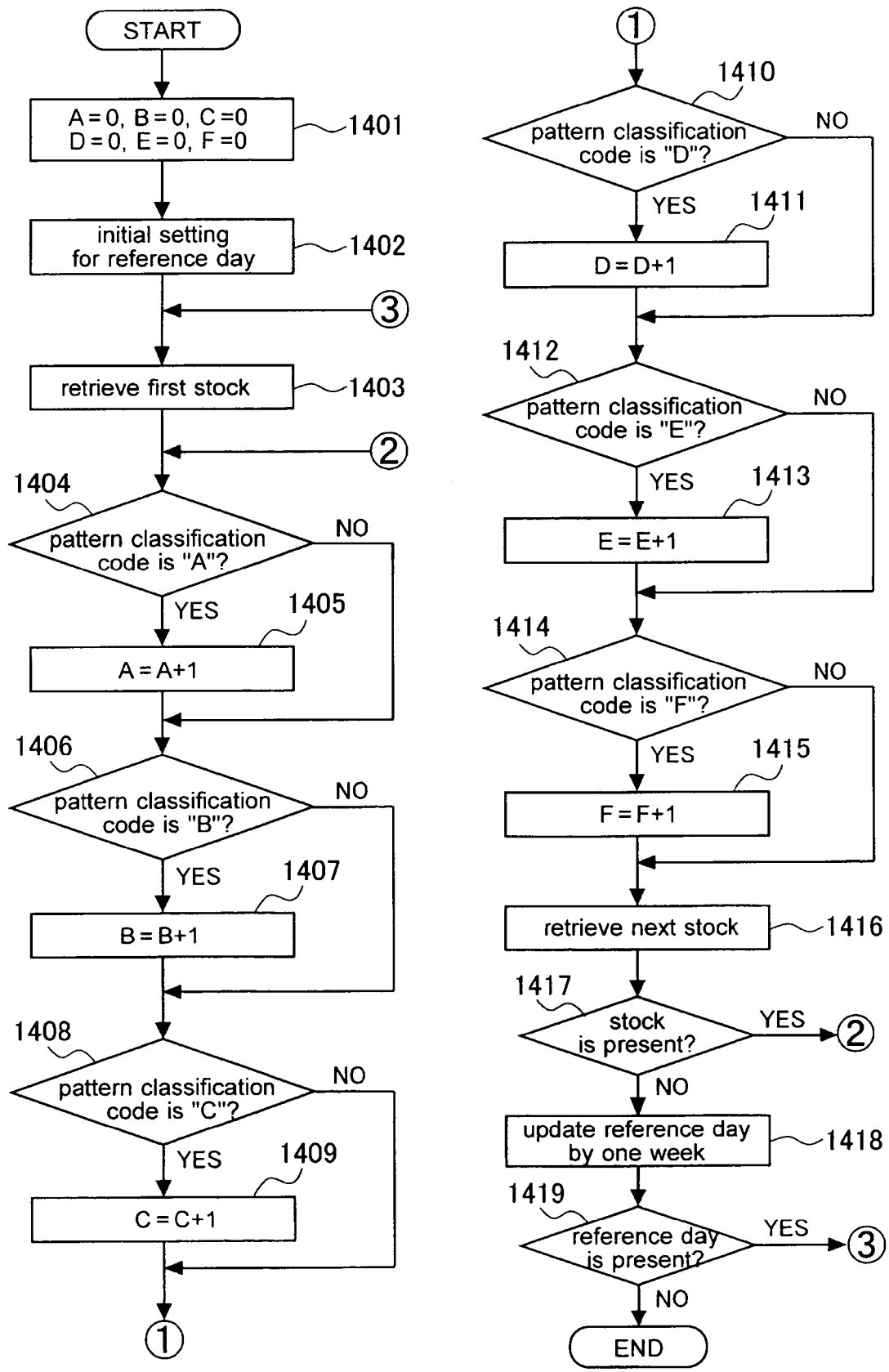
FIG. 14 is a flowchart showing details of number-of-appearances-by-pattern data creation processing.

Referring back to FIG. 10 again, when the six-color pattern data creation processing (step 1004) ends, subsequently, the server apparatus 10 executes number-of-appearances-by-pattern data creation processing (step 1005). Details of the number-of-appearances-by-pattern data creation processing (step 1005) are shown in FIG. 14.

As shown in the figure, in the number-of-appearances-by-pattern data creation processing, first, the server apparatus 10 clears values of number-of-appearances-by-pattern counters A to F (step 1401) and, then, performs initial setting for a reference date (step 1402).

Thereafter, the server apparatus 10 retrieves a first stock in the six-color pattern storing unit 101 (step 1403) and, then, judges whether a pattern classification code obtained at that point is "A" (step 1404), "B" (step 1406), "C" (step 1408), "D" (step 1410), "E" (step 1412), or "F" (step 1414).

In this case, when a judgment result is affirmed in any one of the judgments (steps 1404, 1406, 1408, 1410, 1412, and 1414), a value of the number-of-appearances-by-pattern counter for the affirmed judgment is incremented by 1 (steps 1405, 1407, 1409, 1411, 1413, and 1415).

The server apparatus 10 repeats the operations (steps 1404 to 1415) while changing stocks one after another (step 1406). When the processing reaches a last stock (NO in step 1417), the server apparatus 10 updates the reference date by one week and, then, repeats the operations (steps 1403 to 1417). The server apparatus waits for the processing to reach a latest reference date YES in step 1419) and ends the processing.

Consequently, a data sequence of the number of appearances for each pattern classification code calculated as a result of executing, on the basis of the pattern classification code sequence of each stock stored in the six-color pattern storing unit 101d, an arithmetic operation for obtaining data on the number of appearances of each of the pattern classification codes at each reference time for all stocks included in a group of basic stocks in generating one representative stock movement index such as Nikkei index or TOPIX is stored in the number-of-appearances-by-pattern storing unit 101e (see FIG. 7).

Referring back to FIG. 10 again, when the number-of-appearances-by-pattern data creation processing (step 1005) ends, the server apparatus 10 enters a state in which the server apparatus 10 waits for a transmission request from the client machine 20 (step 1007) while performing reception check (step 1006). When a transmission request arrives from the client machine 20 in this state (YES in step 1007), the server apparatus 10 transmits the candlestick data stored in the candlestick data storing unit 101c and/or the number-of-appearances-by-pattern data stored in the number-of-appearances-by-pattern storing unit 101e to the client machine 20 as a response to the transmission request (step 1008).

The transmission request from the client machine 20 includes stock designation data, candlestick type (a daily candle stick, a weekly candlestick, and a monthly candlestick) designation data, averaged period (a short term, a medium term, and a long term) designation data, and the like. A response from the server apparatus 10 to the client machine 20 is executed in accordance with these designation data.

Figure 15:
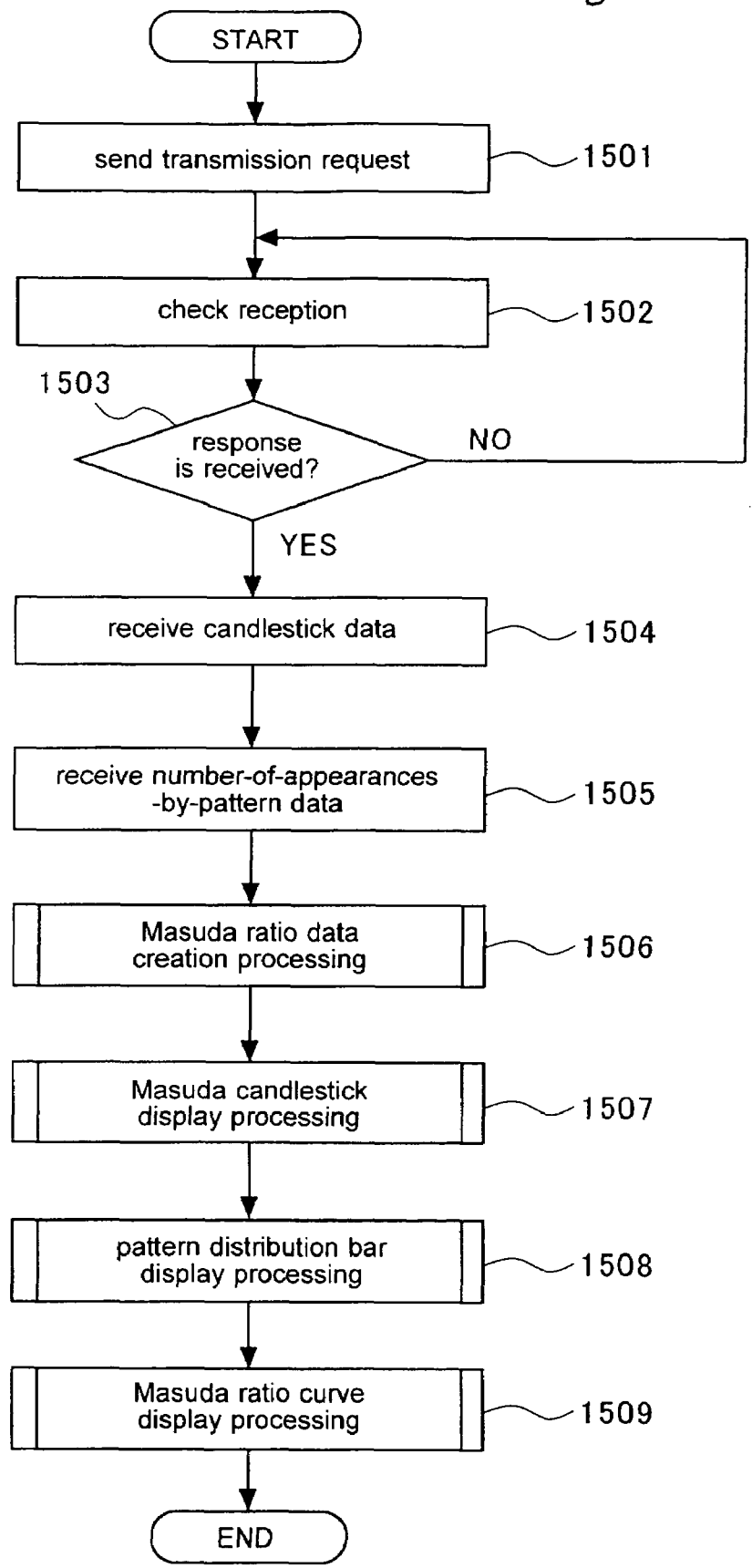
FIG. 15 is a flowchart schematically showing operations on a client apparatus side.
Figure 16:
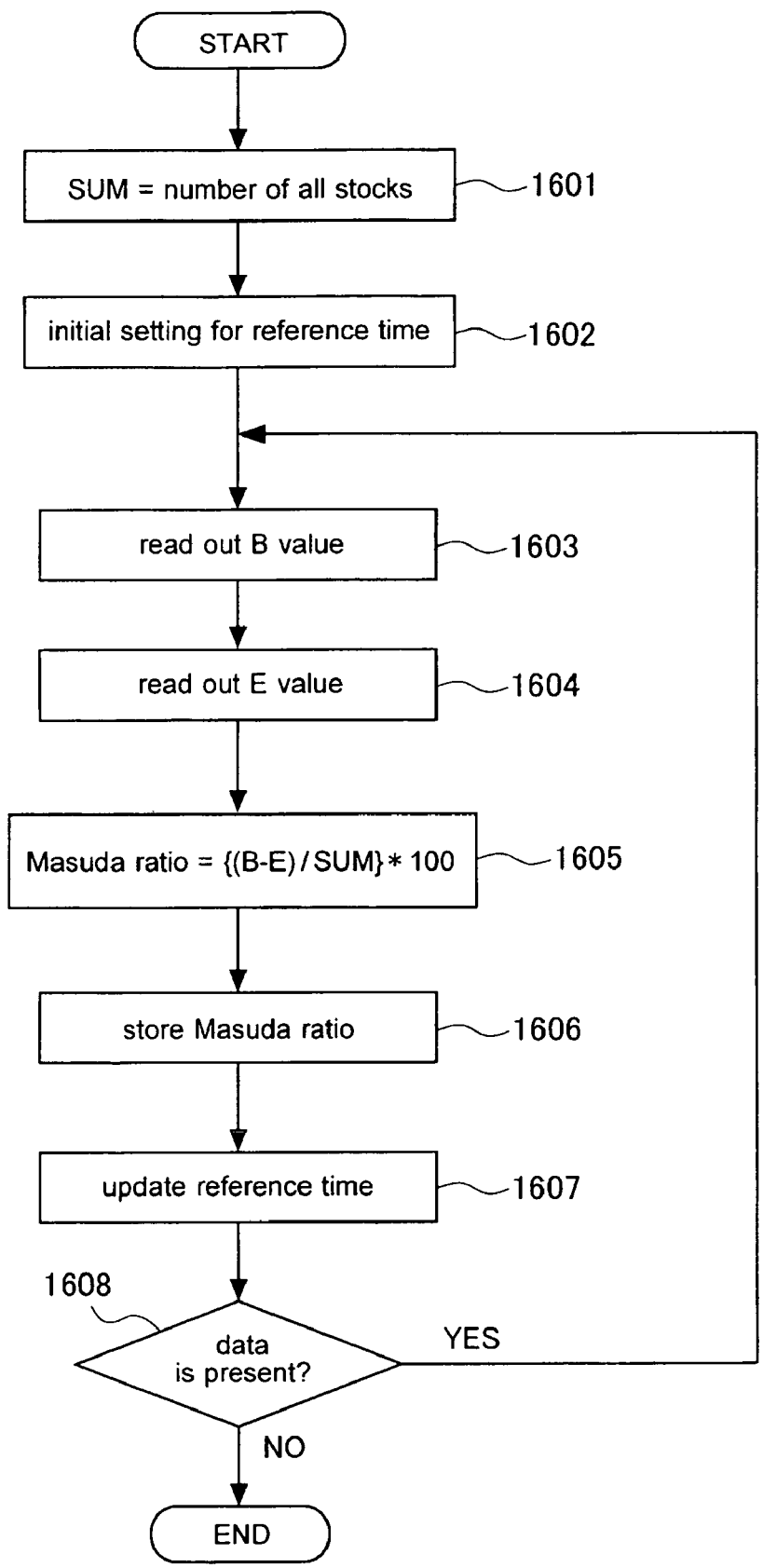
FIG. 16 is a flowchart showing details of Masuda ratio data creation processing.

A software configuration of the client machine 20 will be explained. FIG. 15 is a schematic flowchart showing operation details of the client machine 20.

As shown in the figure, the client machine 20 sends a transmission request to the server apparatus 10 (step 1501) and, then, enters a state in which the client machine 20 waits for a response from the server apparatus 10 (steps 1502 and 1503). The transmission request includes at least stock designation data.

In this state, when candlestick data and number-of-appearances-by-pattern data arrive from the client machine 20 as a response to the transmission request (YES in step 1503), the client machine 20 receives the data and stores the data in the candlestick data storing unit 201b and the number-of-appearances-by-pattern storing unit 201c (steps 1504 and 1505).

Thereafter, the client machine 20 executes Masuda ratio data creation processing that is an essential part of the invention (step 1506). Details of the Masuda ratio data creation processing (step 1506) are shown in a flowchart in FIG. 16.

As shown in the figure, in the Masuda ratio data creation processing, first, the client machine 20 sets the number of all stocks of Nikkei index, TOPIX, or the like in the register SUM (step 1601) and performs initial setting for a reference time (step 1602). Then, the client machine 20 reads out the B value and the E value from the number-of-appearances-by-pattern storing unit 201c (steps 1603 and 1604). As explained above, the B value is the number of stocks in the upward trend and the E value is the number of stocks in the downward trend.

Thereafter, the client machine 20 calculates a Masuda ratio (Mratio) according to the following formula using the B value and the E value (step 1605).

$$M\text{ratio} = \{(B-E)/\text{SUM}\} \times 100$$

The client machine 20 stores a value of the Masuda ratio (Mratio) calculated in this way in the Masuda ratio storing unit 201d (step 1606). Thereafter, the client machine 20 repeats the operations (steps 1603 to 1607) until absence of data in the number-of-appearances-by-pattern storing unit 201c is confirmed (step 1608) while updating the reference time (step 1607).

Consequently, a value of a Masuda ratio (Mratio) calculated as a result of executing, on the basis of a data sequence of the number of appearances of each of the pattern classification codes stored in the number-of-appearances-by-pattern storing unit 201c, an arithmetic operation for obtaining a data sequence of a value of a Masuda ratio (Mratio) or a value substantially equivalent to the Masuda ratio (Mratio) is stored in the Masuda ratio storing unit 201d (see FIG. 8). The Masuda ratio (Mratio) is represented by the following formula.

$$M\text{ratio} = \{(B-E)/\text{SUM}\} \times 100$$

where SUM is a total number of stocks included in a group of specific stocks, B is the number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is the number of stocks, MA1, MA2, and MA3 having a magnitude relation MA1<MA2<MA3 when the number of stocks is E.

Figure 17:
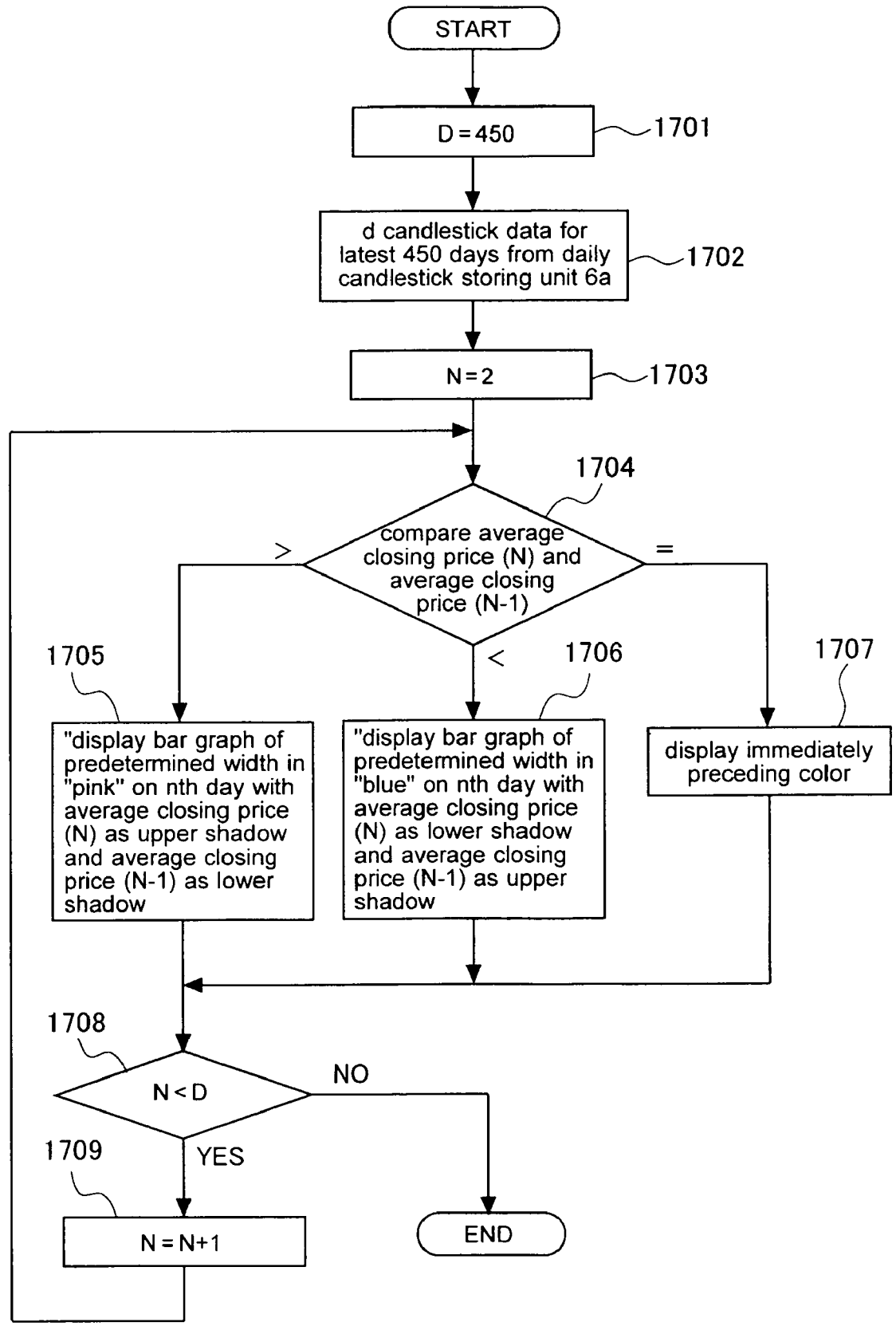
FIG. 17 is a flowchart showing details of Masuda candlestick display processing.
Figure 18:
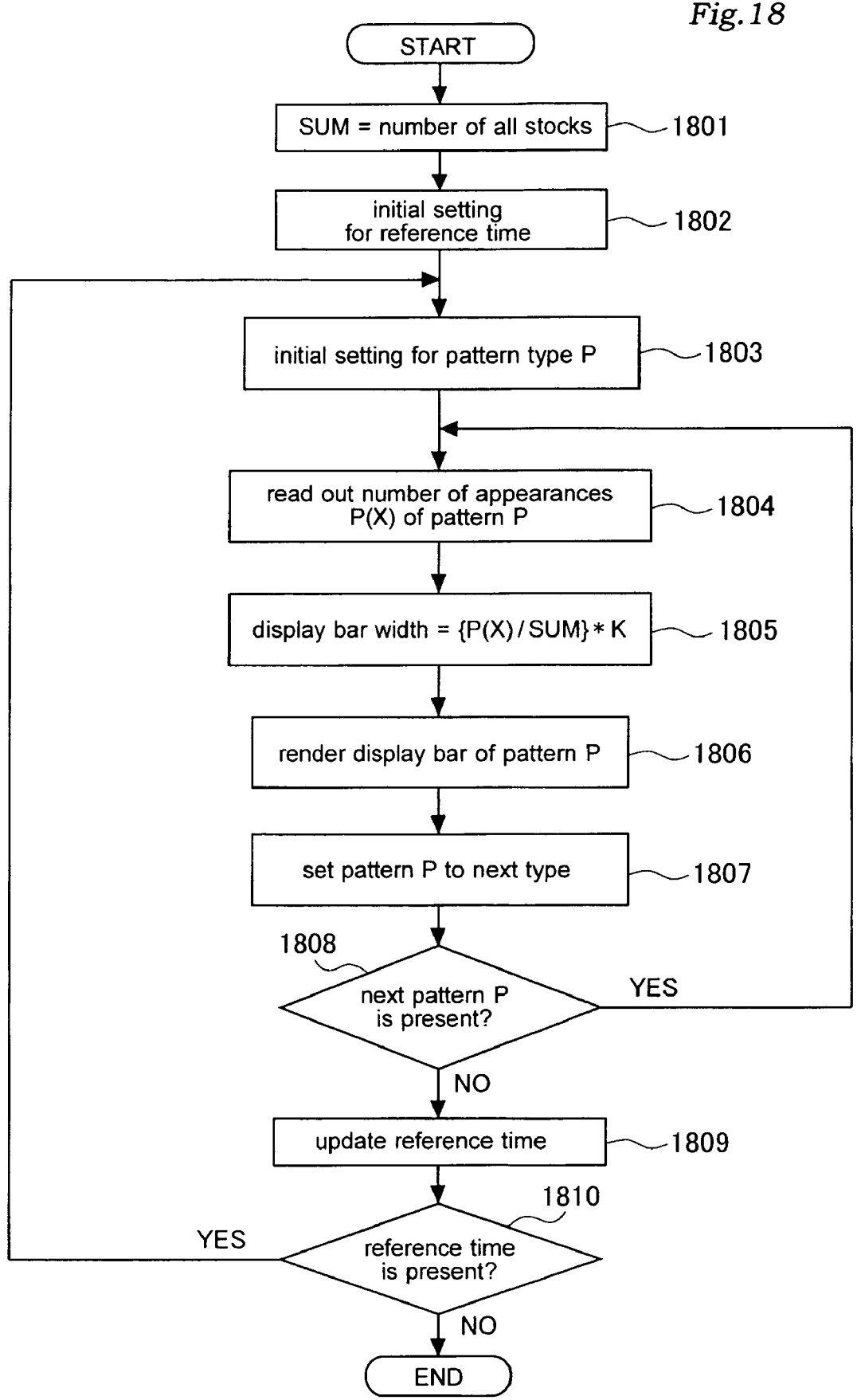
FIG. 18 is a flowchart showing pattern distribution bar display processing.
Figure 19:
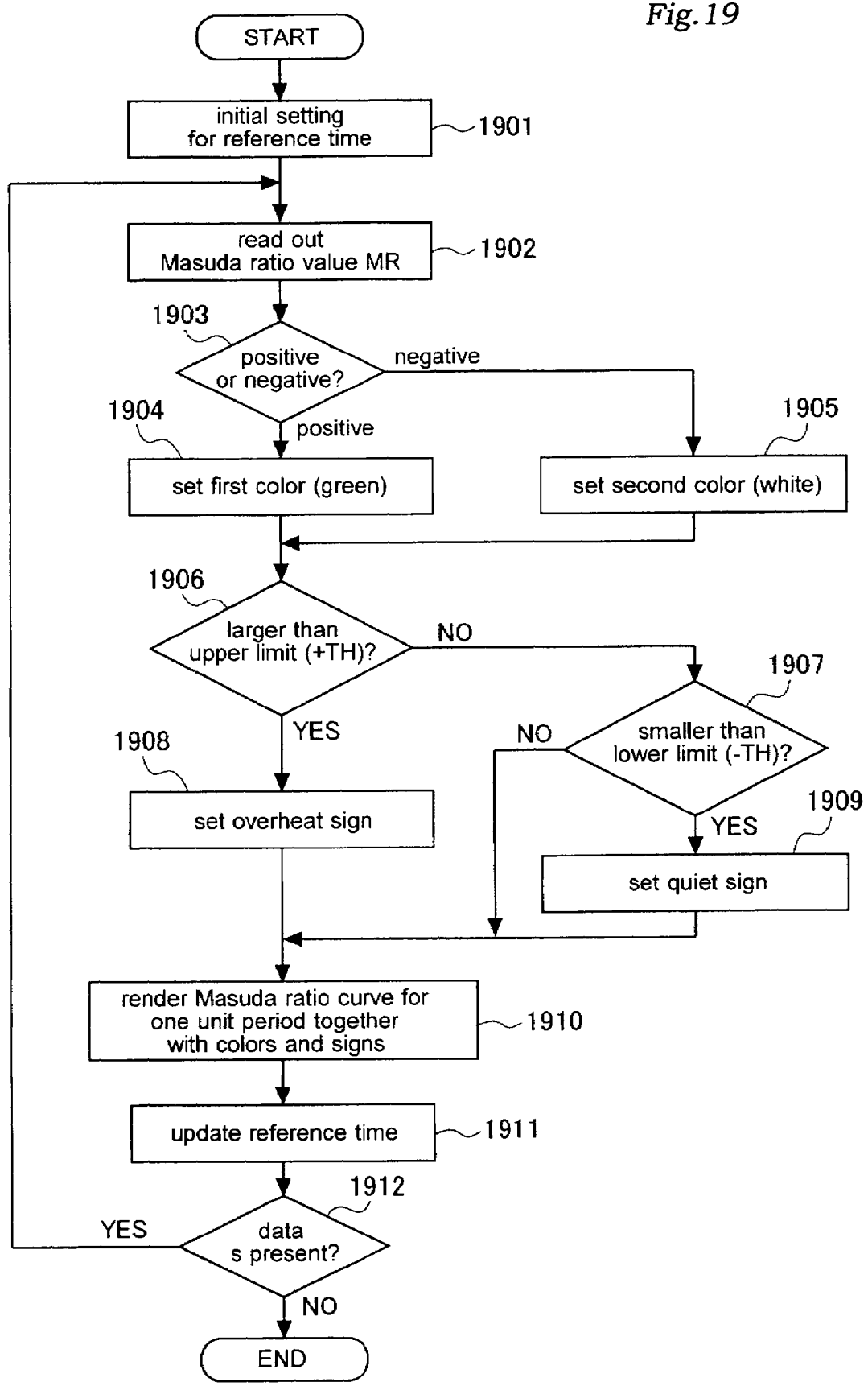
FIG. 19 is a flowchart showing details of Masuda ratio curve display processing.

Referring back to FIG. 15, when the Masuda ratio data creation processing (step 1506) ends, subsequently, the client machine 20 executes Masuda candlestick display processing (step 1507). FIG. 17 is a flowchart showing details of the Masuda candlestick display processing (step 1507).

A method of creating a Masuda candlestick will be explained with reference to the figure. As explained above, daily candlestick data for latest 450 days concerning the stock is used for creation of a daily candlestick. In other words, in the daily candlestick display processing, first, the client machine 20 sets a numerical value "450" smaller than the number of created candlesticks by one in a comparative value D (step 1701). Since the "daily candlestick" is used in this example, the comparative value D is set to 450. However, a numerical value is "192" in the case of the weekly candlestick and is "176" in the case of the monthly candlestick.

Subsequently, the client machine 20 reads candlestick data for latest 450 days from the daily candlestick storing unit 6 of the client machine 20 (step 1702) and sets a numerical value "2" in a counter N (step 1703). This counter N is a counter for specifying the candlestick data read out in order from oldest one. An initial value of the counter N is set to "2" because two closing average prices of the day and the previous day are required for creation of a Masuda candlestick.

In step S1704, the client machine 20 compares an (N)th closing average price (a closing average price of the day) and an (N−1)th closing average price (a closing average price of the previous day) of the read-out daily candlestick data. When the (N)th closing average price is larger than the (N−1)th closing average price, the client machine 20 displays a pink Masuda candlestick with the closing average price (N) as an upper line and the closing average price (N−1) as a lower line on relevant coordinates on the basis of date data specified by the counter N (step 1705).

Similarly, when the (N)th closing average price is smaller than the (N−1)th closing average price, the client machine 20 displays a blue Masuda candlestick with the closing average price (N) as a lower line and the closing average price (N−1) as an upper line on relevant coordinates on the basis of date data specified by the counter N (step 1706).

When the (N)th closing average price and the (N−1)th closing average price are the same, the client machine 20 displays a horizontal bar with a color identical with an immediately preceding bar on relevant coordinates on the basis of date data specified by the counter N (step 1707).

Subsequently, the client machine 20 judges whether N is smaller than D (step 1708). When N is smaller than D, the client machine 20 counts up N by 1 (step 1709) and returns to the processing in step 1704. The client machine 20 repeats these kinds of processing until a value of the counter N reaches D (NO in step 1708).

Referring back to FIG. 15 again, when the Masuda candlestick display processing (step 1507) ends, subsequently, the client machine 20 executes pattern distribution bar display processing (step 1508). Details of the pattern distribution bar display processing (step 1508) are shown in a flowchart in FIG. 18.

As shown in the figure, in the pattern distribution bar display processing, first, the client machine 20 sets the number of all stocks in the register SUM (step 1801) and performs initial setting for a reference time (step 1802). Then, the client machine 20 changes a value of a pattern type P from the "pattern F" to the "pattern A", the "pattern B", the "pattern C", the "pattern D", and the "pattern E" (steps 1803 and 1807). Every time the client machine 20 changes the value of the pattern type P, the client machine 20 repeatedly executes processing for reading out the number of appearances P(X) of the pattern P from a section designated by the reference time of the number-of-appearances-by-pattern storing unit 201 (step 1804), processing for determining a vertical width of a P pattern bar by normalizing a ratio of the number of appearances P(X) read out ({P(X)/SUM}×constant K) (step 1805), and processing for rendering a vertical direction display bar for one unit period of the P pattern bar (step 1806). In this example, a display color of an F pattern bar is "white", a display color of an A pattern bar is "yellow", a display color of a B pattern bar is "green", a display color of a C pattern bar is "red", a display color of a D pattern bar is "blue", and a display color of an E pattern bar is "black".

If the next pattern P is not present any more while the client machine 20 repeats the operations (steps 1804 to 1807), while updating the reference time by one unit (day, week, or month) (step 1809), the client machine 20 repeats the operations (steps 1803 to 1809). When the reference time reaches a latest value (NO in step 1810), the client machine 20 ends the processing.

Referring back to FIG. 15 again, when the pattern distribution bar display processing (step 1508) ends, subsequently, the client machine 20 executes Masuda ratio curve display processing (step 1509). Details of the Masuda ratio curve display processing (step 1509) are shown in a flowchart in FIG. 19.

As shown in the figure, in the Masuda ratio curve display processing, first, the client machine 20 performs initial setting for a reference time (step 1901) and, then, executes processing for reading out a Masuda ratio value MR from a section designated by a reference time in the Masuda ratio storing unit 201*d* (step 1902).

Subsequently, the client machine 20 judges whether the Masuda ratio value MR read out is positive or negative (step 1903). When it is judged that the Masuda ratio value MR is positive ("POSITIVE" in step 1903), the client machine 20 sets a display color of a unit period (day, week, or month) of the Masuda ratio curve to a first color (e.g., green) (step 1904). On the other hand, when it is judge that the Masuda ratio value MR is negative ("NEGATIVE" in step 1903), the client machine 20 sets a display color of a unit period (day, week, or month) of the Masuda ratio curve to a second color (e.g., white) (step 1905). In this case, a background color of the display area is dark gray.

Subsequently, the client machine 20 performs processing for comparing the Masuda ratio value MR and a predetermined upper limit value (+TH) (step 1906) and processing for comparing the Masuda ratio value MR with a predetermined lower limit value (−TH) (step 1907). At this point, the upper limit value (+TH) only has to be set to an arbitrary value, for example, in a range of +70(%) to +80(%). Similarly, the lower limit value (−TH) only has to be set to an arbitrary value, for example, in a range of −50(%) to −60(%). When it is judged that the Masuda ratio value MR is larger than the upper limit value (+TH) (YES in step 1906), the client machine 20 performs setting for an "overheated" sign (step 1908). On the other hand, when it is judged that the Masuda ratio value MR is smaller than the lower limit value (−TH) (YES in step 1907), the client machine 20 performs setting for a "quiet" sign (step 1909). When the Masuda ratio value MR is smaller than the upper limit value (+TH) and larger than the lower limit value (−TH) (NO in steps 1906 and 1907), the client machine 20 performs neither the setting for the "overheated" sign nor the setting for the "quiet" sign.

When the setting for the display colors and the setting for the "overheated" or "quiet" sign are performed in this way, subsequently, the client machine 20 renders a Masuda ratio curve for one unit period with the set display colors (step 1910). Thereafter, while updating the reference time by the unit period (day, week, or month) (step 1911), the client machine 20 repeatedly executes the processing (steps 1902 to 1910) until no data is left (NO in step 1912). Simultaneously, a symbol figure equivalent to the "overheated" sign is displayed in a display area 307 described later and a symbol figure equivalent to the "quiet" sign is displayed in a display area 308.

Figure 20:
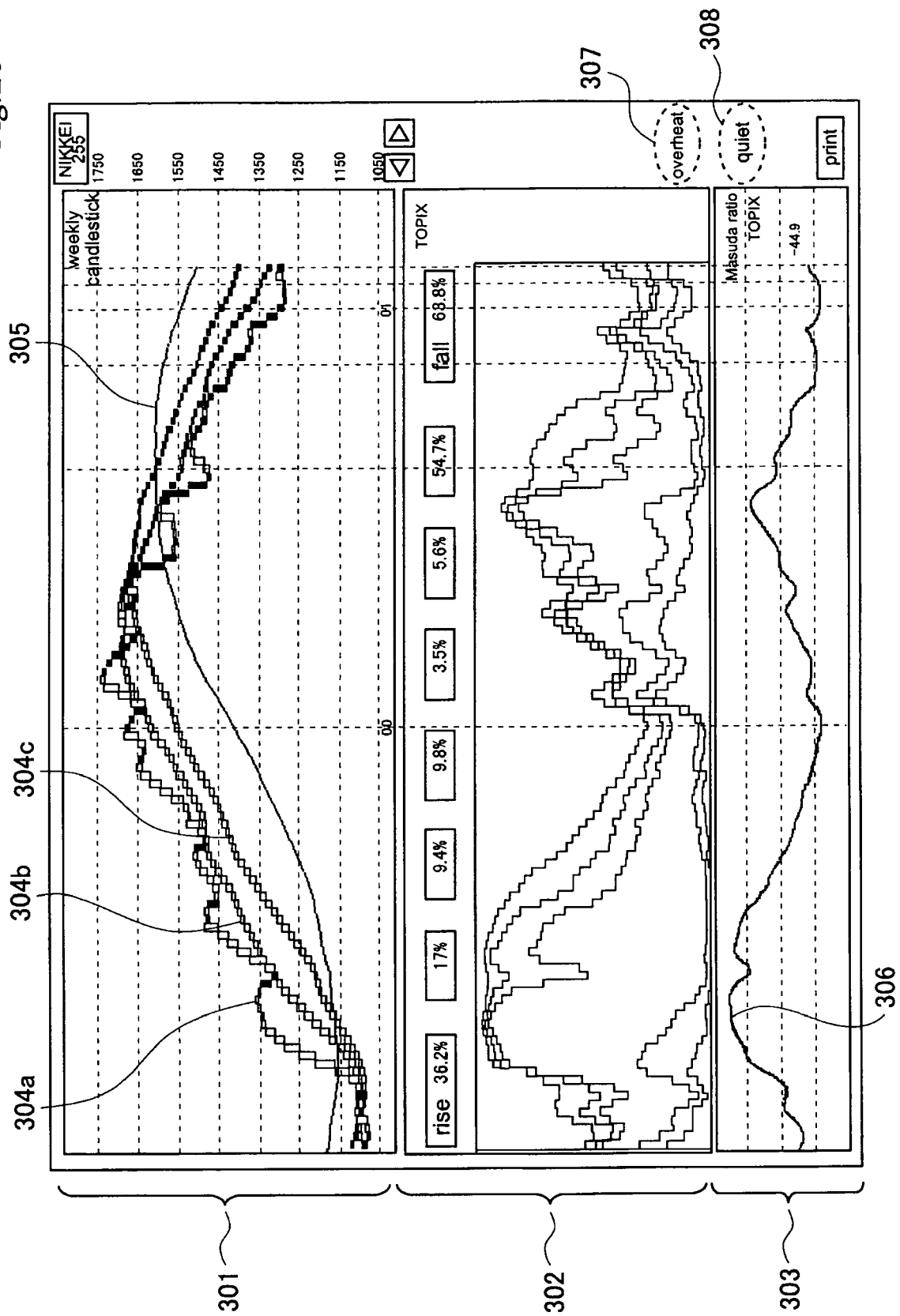
FIG. 20 is a diagram showing an example of a display screen including a Masuda candlestick curve, a pattern distribution bar, and a Masuda ratio curve.

FIG. 20 is a diagram showing an example of a display screen including a Masuda candlestick curve, a pattern distribution bar, and a Masuda ratio curve. As shown in the figure, in this example, a display screen of the display device 103a is divided into a Masuda candlestick curve display area 301, a pattern distribution bar display area 302, and a Masuda ratio curve display area 303 in order from the top.

In the Masuda candlestick curve display area 301, in this example, a short term Masuda candlestick curve 304a, a medium term Masuda candlestick curve 304b, a long term Masuda candlestick curve 304c, and a Nikkei index curve 305 concerning Nikkei index (Nikkei 225) are drawn. A pattern distribution bar described later is displayed in the pattern distribution bar display area 302. A Masuda ratio curve 306 based on TOPIX is drawn in the Masuda ratio curve display area 303. Time axes of the areas 301, 302, and 303 are common. In this example, an "overheated" sign display area 307 and a "quiet" sign display area 308 are provided in a small area on the lower right of the display screen.

Figure 21:
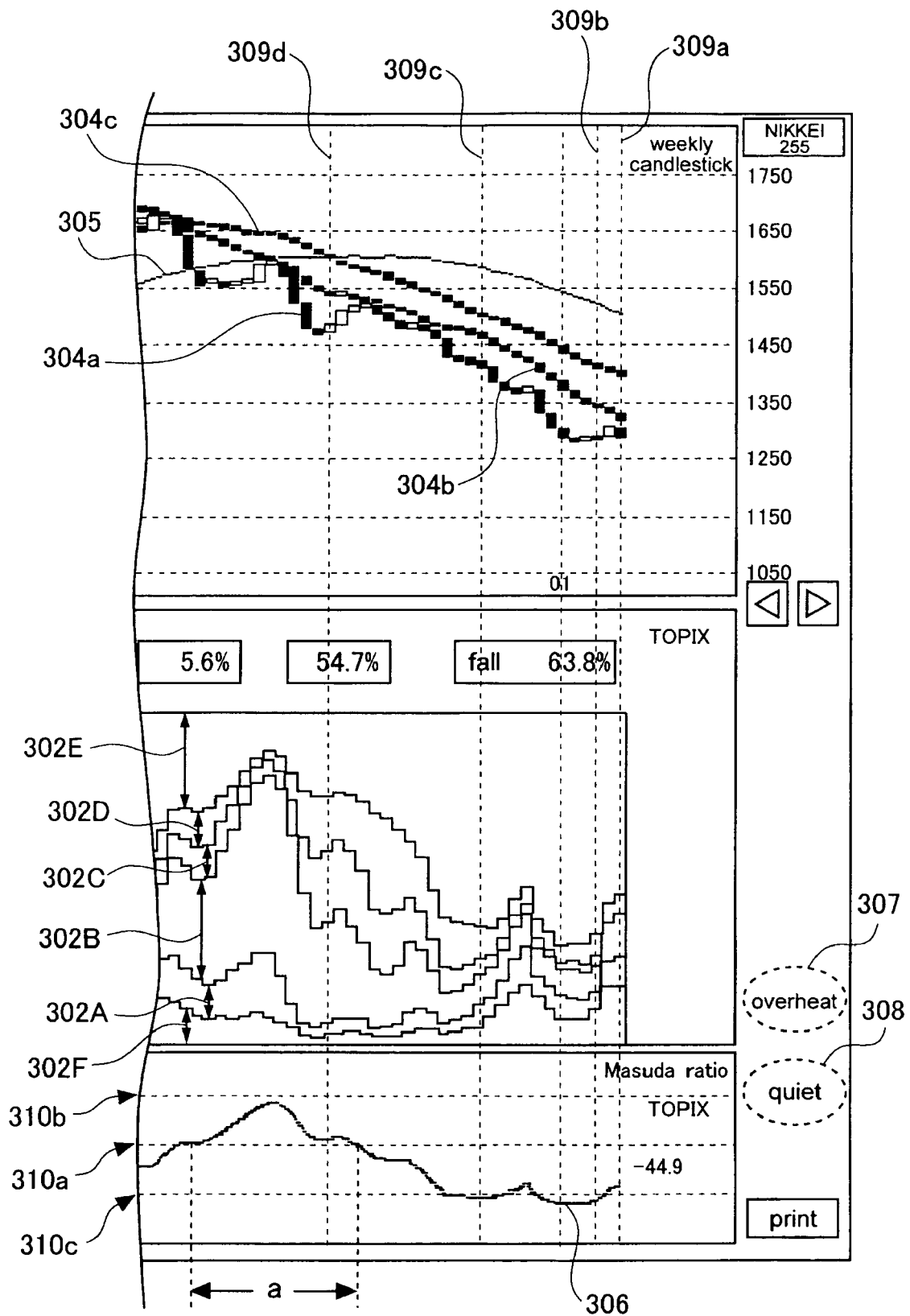
FIG. 21 is an enlarged diagram of a display screen.

An enlarged diagram of the screen is shown in FIG. 21. As shown in the figure, in the Masuda candlestick curve display area 301, other than the Masuda candlestick curves 304a to 304c and the Nikkei index curve 305, a reference point cursor line 309a, a short term start point cursor line 309b, a medium start point cursor line 309c, and a long term start point cursor 309d are displayed. It is possible to move the cursor lines in a time axis direction (a horizontal direction) to arbitrary positions while maintaining a fixed distance among the cursor lines.

Pattern distribution bars displayed in the pattern distribution bar display area 302 include an F pattern bar 302F of white, an A pattern bar 302A of yellow, a B pattern bar 302B of green, a C pattern bar 302C of red, a D pattern bar 302D of blue, and an E pattern bar of black (gray), which are arranged in order from the bottom. Vertical direction widths of the respective pattern bars 302A to 302F correspond to the numbers of stocks of the respective patterns present in a group of basic stocks constituting TOPIX.

In the Masuda ratio curve display area 303, other than the Masuda ratio curve 306, a neutral (±0) line 310a, an upper limit (+TH) line 310b, and a lower limit (−TH) line 310c are drawn. A display color of the Masuda ratio curve 306 is green for a positive section "a" drawn by a solid line in the figure and is white for a negative section drawing by a wavy line in the figure. A background color is a dark color.

Therefore, according to the screen display form, it is possible to observe stock movements of the stock (Nikkei index in the example shown in the figure; a specific stock at the time of actual stock trading) on the basis of the Masuda candlestick curves 304a to 304c in the short term, the medium term, and the long term drawn in the Masuda candlestick curve display area 301. It is also possible to intuitively grasp stock movements as an entire market from the viewpoint of the six kinds of trends (the "entrance of the upward trend", the "upward trend", the "crash of the upward trend", the "entrance of the downward trend", the "downward trend", and the "end of the downward trend) on the basis of the pattern distribution bars drawn in the pattern distribution bar display area 302. Moreover, it is possible to accurately grasp market sentiments such as a selling tendency or a buying tendency on the basis of the Masuda ratio curve 306 drawn in the Masuda ratio curve display area 303. Thus, it is possible to appropriately judge timing for selling and buying for a target stock in conjunction with contents of the "overheated" sign display area 307 and the "quite" sign display area 308.

As an index for grasping market sentiments, Nikkei index and TOPIX have been conventionally known. However, a characteristic of the Masuda ratio curve according to the invention is largely different from a characteristic of conventional exponential curves such as Nikkei index and TOPIX. The conventional exponential curves significantly depend on a total amount of stock prices of all stocks Thus, for example, even if the number of stocks is relatively small, when high-priced stocks are intensively hunted, the exponential curves themselves show a rising tendency even under a situation in which stock prices of the other stocks are falling. This is a factor in upset of selling and buying senses of most people in the market. On the other hand, since the characteristic of the Masuda ratio curve of the invention does not depend on a total amount of stock prices of all stocks, the Masuda radio curve accurately reflects market sentiments such as a selling tendency and a buying tendency in the market.

Figure 22:
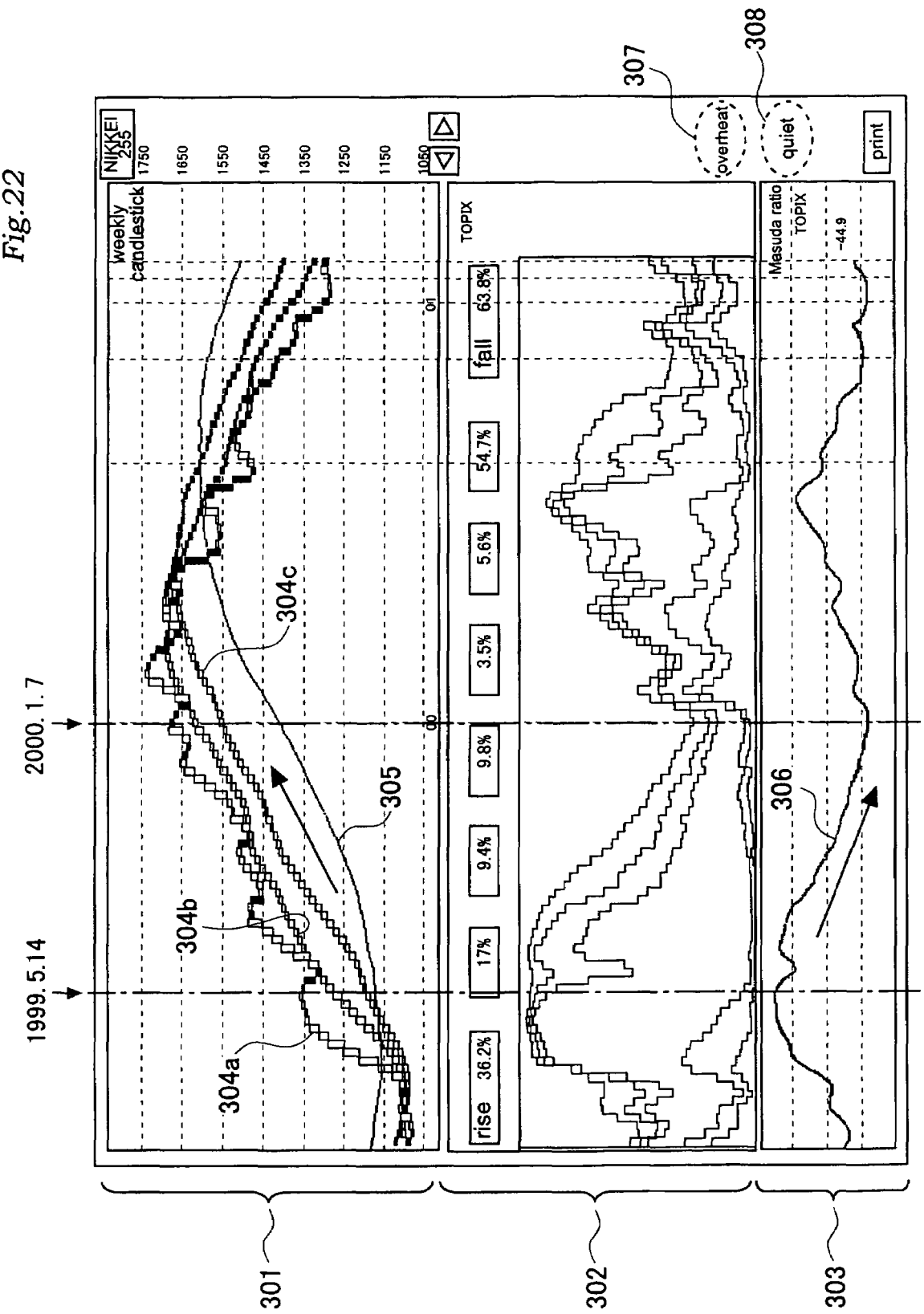
FIG. 22 is a diagram for explaining advantages of a Masuda ratio curve.

A specific example of the characteristic of the Masuda ratio curve is shown in FIG. 22. A point of special attention in the figure is a section from May 14, 1999 to Jan. 7, 2000. In this example, in calculation of a value of a Masuda ratio, stocks in the first section of the Tokyo Stock Exchange are set as all stocks (SUM).

When attention is paid only to changes of values of the Masuda candlestick curves (weekly candlestick) 304a, 304b, and 304c in the short term, the medium term, and the long term and the Nikkei index curve 305 in the Masuda candlestick curve display area 301, all of the curves show a rising tendency. It seems that an aggregate market value of all the stocks included in Nikkei index is in a rising tendency. However, when attention is paid to a value of the Masuda ratio curve in the Masuda ratio curve display area 303, in contrast, the value shows a falling tendency. This indicates that the number of stocks with stock prices in the rising tendency (equivalent to B) decreases or the number of stocks with stock prices in the falling tendency (equivalent to E) increases in all the stocks in the first section of the Tokyo Stock Exchange.

Consequently, it is seen that, according to the Masuda ratio curve 306, even when the number of stocks with stock prices in the falling tendency actually increases despite the fact that a value of the Nikkei index (Nikkei 225) is in the rising tendency, the market movements are accurately reflected. From this example, it would be understood that the Masuda ratio curve 306 is not affected by fluctuation in market prices of a part of specific stocks and is suitable for more accurately grasping actuality of market movements that investors desire to know.

In the embodiment described above, Nikkei index and TOPIX are described as examples of a stock price movement index. However, instead of Nikkei index and TOPIX, NASDAQ, DOW, SP500, and the like may be adopted.

According to the invention, in addition to adoption of the group of specific stocks forming a basis in generating one representative stock movement index such as Nikkei index or TOPIX that originally tends to reflect market sentiments, a difference (B−E) between the number of stocks in the upward trend and the number of stocks in the downward trend in the six-color pattern classification proposed by the inventor is divided by the total number of the group of specific stocks (SUM). Thus, the value of the Masuda ratio (Mratio) generated in this way is less easily affected by a price difference among the respective stocks and accurately reflects the market sentiments such as a degree of a buying tendency and a degree of a selling tendency. Therefore, if the value of the Masuda ratio obtained in this way is visualized, a user intending to trade stocks can accurately grasp timing for selling and buying while accurately grasping market sentiments at every moment. It is also possible to accurately grasp movements of marketable securities that are traded in the same manner as stocks such as Exchange-Traded Funds (ETF) associated with Tokyo Stock Exchange Price Index (TOPIX), Nikkei 225 stock index, and the like.

What is claimed is:

1. A stock price chart display method utilizing a server apparatus and a client machine connectable via the Internet, comprising:

a data base constructing step of constructing a database in one of the server apparatus and the client machine including stock price information for a nearest predetermined maximum period concerning each of a group of stocks on the basis of stock price information acquired from a stock price information issue source via the Internet;

a first arithmetic operation step of executing, on the basis of stock price information of respective stocks determined in advance on the database, an arithmetic operation in one of the server apparatus and the client machine for calculating moving average deviations of stock prices in a short term, a medium term, and a long term nearest to a reference time in at least one time unit selected from day, week, and month, respectively;

a first storing step of storing a data sequence of the moving average deviations of the stock prices in the short term, the medium term, and the long term, which are calculated in the first arithmetic operation step, in a memory of one of the server apparatus and the client machine for each of the stocks;

a second arithmetic operation step of executing, on the basis of the data sequence of the moving average deviations of the respective stocks stored in the memory in the first storing step, an arithmetic operation in one of the server apparatus and the client machine for obtaining pattern classification codes indicating to which of six patterns determined in advance a relation among magnitudes of data on the moving average deviations of the stock prices in the short term, the medium term, and the long term is classified;

a second storing step of storing a sequence of the pattern classification codes obtained in the second arithmetic operation step in the memory for each of the stocks;

a third arithmetic operation step of executing, on the basis of the sequence of the pattern classification codes of the respective stocks stored in the memory in the second storing step, an arithmetic operation in one of the server apparatus and the client machine for obtaining data on a number of appearances for each of the pattern classification codes at each reference time concerning all the stocks included in the group of basic stocks in generating one representative stock movement index;

a third storing step of storing a sequence of the data on a number of appearances for each of the pattern classification codes obtained in the third arithmetic operation step in the memory;

a fourth arithmetic operation step of executing, on the basis of a data sequence of a number of appearances for each of the pattern classification codes stored in the memory in the second storing step, an arithmetic operation in one of the server apparatus and the client machine for calculating a value of a Masuda ratio (Mratio) or a value substantially equivalent to the Masuda ratio (Mratio), the Masuda ratio (Mratio) being represented by a formula Mratio={(B−E)/SUM}×100, where SUM is a total number of stocks included in the group of basic stocks, B is a number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is a number of stocks, MA1, MA2, and MA3 having a magnitude relation Ma1<MA2<MA3 when the number of stocks is E;

a first rendering processing step of displaying Masuda candlestick curves in the short term, the medium term, and/or the long term concerning one stock on a predetermined area of a display screen of one of the server apparatus and the client machine on the basis of the data sequence of the moving average deviations of the stock prices in the short term, the medium term, and the long term stored in the memory in the first storing step; and a second rendering processing step of displaying a Masuda ratio curve concerning one stock on a predetermined area of the display screen on the basis of the data sequence of the value of the Masuda ratio (Mratio) or the value substantially equivalent to the Masuda ratio (Mratio) stored in the memory in the fourth storing step.

2. The stock price chart display method according to claim 1, further comprising a third rendering processing step of displaying pattern distribution bars concerning all the stocks included in the group of basic stocks in a predetermined area of the display screen on the basis of the data sequence of the number of appearances for each of the pattern classification codes stored in the memory in the third storing step.

3. A stock price chart display system in which a server apparatus and a client machine are connectable via the Internet, wherein the server apparatus comprises:

a data base constructing unit that constructs a database including stock price information for a nearest predetermined maximum period concerning each of a group of stocks on the basis of stock price information acquired from a stock price information issue source via the Internet;

a first arithmetic operation unit that executes, on the basis of stock price information of respective stocks determined in advance on the database, an arithmetic operation for calculating moving average deviations of stock prices in a short term, a medium term, and a long term nearest to a reference time in at least one time unit selected from day, week, and month, respectively;

a first storing unit that stores a data sequence of the moving average deviations of the stock prices in the short term, the medium term, and the long term, which are calculated by the first arithmetic operation unit, for each of the stocks;

a second arithmetic operation unit that executes, on the basis of the data sequence of the moving average deviations of the respective stocks stored in the first storing unit, an arithmetic operation for obtaining pattern classification codes indicating to which of six patterns determined in advance a relation among magnitudes of data on the moving average deviations of the stock prices in the short term, the medium term, and the long term is classified;

a second storing unit that stores a sequence of the pattern classification codes obtained by the second arithmetic operation unit for each of the stocks;

a third arithmetic operation unit that executes, on the basis of the sequence of the pattern classification codes of the respective stocks stored in the second storing unit, an arithmetic operation for obtaining data on a number of appearances for each of the pattern classification codes at each reference time concerning all the stocks included in the group of basic stocks in generating one representative stock movement index;

a third storing unit that stores a sequence of the data on a number of appearances for each of the pattern classification codes obtained by the third arithmetic operation unit a first data transmitting unit that reads out the data sequence of moving average deviations of the stock prices in the short term, the medium term, and the long term concerning one stock from the first storing unit and transmits the data sequence of moving average deviations to the client machine; and a second data transmitting unit that reads out the data sequence of the number of appearances for each of the pattern classification codes concerning the group of basic stocks in generating one representative stock movement index from the third storing unit and transmits the data sequence of the number of appearances to the client machine, and the client machine comprises:

a first storing unit that stores the data sequence of moving average deviations of the stock prices in the short term, the medium term, and the long term concerning one stock sent from the server apparatus;

a second storing unit that stores the data sequence of the number of appearances for each of the pattern classification codes concerning the group of basic stocks in generating the one stock movement index sent from the server apparatus;

a first arithmetic operation unit that executes, on the basis of the data sequence of the number of appearances for each of the pattern classification codes stored in the second storing unit, an arithmetic operation for calculating a value of a Masuda ratio (Mratio) or a value substantially equivalent to the Masuda ratio (Mratio), the Masuda ratio (Mratio) being represented by the following formula:

$$Mratio = \{(B-E)/SUM\} \times 100,$$

where SUM is a total number of stocks included in the group of basic stocks, B is a number of stocks, average moving deviations of stock prices in a short term, an intermediate term, and a long term nearest to a reference time in one time unit selected from day, week, and month (MA1, MA2, and MA3) among the group of specific stocks having a magnitude relation MA1>MA2>MA3 when the number of stocks is B, and E is a number of stocks, MA1, MA2, and MA3 having a magnitude relation Ma1<MA2<MA3 when the number of stocks is E;

a third storing unit that stores a data sequence of the value of the Masuda ratio (Mratio) or the value substantially equivalent to the Masuda ratio (Mratio) calculated by the first arithmetic operation unit;

a first rendering processing unit that displays Masuda candlestick curves in the short term, the medium term, and/or the long term concerning one stock on a predetermined area of a display screen on the basis of the data sequence of the moving average deviations of the stock prices in the short term, the medium term, and the long term stored in the first storing unit; and a second rendering processing unit displays a Masuda ratio curve concerning one stock on a predetermined area of the display screen on the basis of the data sequence of the value of the Masuda ratio (Mratio) or the value substantially equivalent to the Masuda ratio (Mratio) stored in the third storing unit.

4. The stock price chart display system according to claim 3, wherein the client machine further comprises a third rendering processing unit that displays pattern distribution bars concerning all the stocks included in the group of basic stocks in a predetermined area of the display screen on the basis of the data sequence of the number of appearances for each of the pattern classification codes stored in the second storing unit.

5. A computer readable medium containing instructions executable on a computer for causing the computer to function as a server apparatus, the server apparatus comprising:

a data base constructing unit that constructs a database including stock price information for a nearest predetermined maximum period concerning each of a group of stocks on the basis of stock price information acquired from a stock price information issue source via the internet;

a first arithmetic operation unit that executes, on the basis of stock price information of respective stocks determined in advance on the database, an arithmetic operation for calculating moving average deviations of stock prices in a short term, a medium term, and a long term nearest to a reference time in at least one time unit selected from day, week, and month, respectively;

a first storing unit that stores a data sequence of the moving average deviations of the stock prices in the short term, the medium term, and the long term, which are calculated by the first arithmetic operation unit, for each of the stocks;

a second arithmetic operation unit that executes, on the basis of the data sequence of the moving average deviations of the respective stocks stored in the first storing unit, an arithmetic operation for obtaining pattern classification codes indicating to which of six patterns determined in advance a relation among magnitudes of data on the moving average deviations of the stock prices in the short term, the medium term, and the long term is classified;

a second storing unit that stores a sequence of the pattern classification codes obtained by the second arithmetic operation unit for each of the stocks;

a third arithmetic operation unit that executes, on the basis of the sequence of the pattern classification codes of the respective stocks stored in the second storing unit, an arithmetic operation for obtaining data on a number of appearances for each of the pattern classification codes at each reference time concerning all the stocks included in the group of basic stocks in generating one representative stock movement index;

a third storing unit that stores a sequence of the data on a number of appearances for each of the pattern classification codes obtained by the third arithmetic operation unit;

a first data transmitting unit that reads out the data sequence of moving average deviations of the stock prices in the short term, the medium term, and the long term concerning one stock from the first storing unit and transmits the data sequence of moving average deviations to the client machine; and a second data transmitting unit that reads out the data sequence of the number of appearances for each of the pattern classification codes concerning the group of basic stocks in generating one representative stock movement index from the third storing unit and transmits the data sequence of the number of appearances to the client machine.

6. A computer readable medium containing instructions executable on a computer for causing the computer to function as a client machine, the client machine comprising:

a first storing unit that stores data sequence of moving average deviations of stock prices in a short term, a medium term, and a long term concerning one stock sent from a server apparatus;

a second storing unit that stores data sequence of a number of appearances for each of pattern classification codes concerning a group of basic stocks in generating one stock movement index sent from the server apparatus;

a first arithmetic operation unit that executes, on the basis of the data sequence of the number of appearances for each of the pattern classification codes stored in the second storing unit, an arithmetic operation for calculating a value of a Masuda ratio (Mratio) or a value substantially equivalent to the Masuda ratio (Mratio), the Masuda ratio (Mratio) being represented by the following formula:

$$Mratio=\{(B-E)/SUM\} \times 100,$$

where SUM is a total number of stocks included in the group of basic stocks in generating one representative stock movement index, B is a number of stocks, average moving deviations of stock prices in a short term, an intermediate term, and a long term nearest to a reference time in one time unit selected from day, week, and month (MA1, MA2, and MA3) among the group of specific stocks having a magnitude relation Ma1>MA2>MA3 when the number of stocks is B, and E is a number of stocks, MA1, MA2, and MA3 having a magnitude relation MA1<MA2<MA3 when the number of stocks is E;

a third storing unit that stores a data sequence of the value of the Masuda ratio (Mratio) or the value substantially equivalent to the Masuda ratio (Mratio) calculated by the first arithmetic operation unit;

a first rendering processing u nit that displays Masuda candlestick curves in the short term, the medium term, and/or the long term concerning one stock on a predetermined area of a display screen on the basis of the data sequence of the moving average deviations of the stock prices in the short term, the medium term, and the long term stored in the first storing unit; and a second rendering processing unit that displays a Masuda ratio curve concerning one stock on a predetermined area of the display screen on the basis of the data sequence of the value of the Masuda ratio (Mratio) or the value substantially equivalent to the Masuda ratio (Mratio) stored in the third storing unit.

7. A computer readable medium containing instructions executable on a computer for causing the computer to function as a client machine, the client machine comprising:

a first storing unit that stores data sequence of moving average deviations of stock prices in a short term, a medium term, and a long term concerning one stock sent from a server apparatus;

a second storing unit that stores data sequence of a number of appearances for each of pattern classification codes concerning a group of basic stocks in generating one stock movement index sent from the server apparatus;

a first arithmetic operation unit that executes, on the basis of the data sequence of the number of appearances for each of the pattern classification codes stored in the second storing unit, an arithmetic operation for calculating a value of a Masuda ratio (Mratio) or a value substantially equivalent to the Masuda ratio (Mratio), the Masuda ratio (Mratio) being represented by the following formula:

$$Mratio=\{(B-E)/SUM\} \times 100,$$

where SUM is a total number of stocks included in the group of basic stocks in generating one representative stock movement index, B is a number of stocks, average moving deviations of stock prices in a short term, an intermediate term, and a long term nearest to a-reference time in one time unit selected from day, week, and month (MA1, MA2, and MA3) among the group of specific stocks having a magnitude relation Ma1>MA2>MA3 when the number of stocks is B, and E is a number of stocks, MA1, MA2, and MA3 having a magnitude relation Ma1<MA2<MA3 when the number of stocks is E;

a third storing unit that stores a data sequence of the value of the Masuda ratio (Mratio) or the value substantially equivalent to the Masuda ratio (Mratio) calculated by the first arithmetic operation unit;

a first rendering processing unit that displays Masuda candlestick curves in the short term, the medium term, and/or the long term concerning one stock on a predetermined area of a display screen on the basis of the data sequence of the moving average deviations of the stock prices in the short term, the medium term, and the long term stored in the first storing unit;

a second rendering processing unit that displays a Masuda ratio curve concerning one stock on a predetermined area of the display screen on the basis of the data sequence of the value of the Masuda ratio (Mratio) or the value substantially equivalent to the Masuda ratio (Mratio) stored in the third storing unit; and a third rendering processing unit that displays pattern distribution bars concerning all the stocks included in the group of basic stocks in a predetermined area of the display screen on the basis of the data sequence of the number of appearances for each of the pattern classification codes stored in the second storing unit.

* * * * *